United States Patent
Bloom

(10) Patent No.: US 12,437,143 B2
(45) Date of Patent: Oct. 7, 2025

(54) RHYME ENGINE FOR LITERARY WORKS WITH RHYME OR RHYTHM

(71) Applicant: Gary Bloom, Malden, MA (US)

(72) Inventor: Gary Bloom, Malden, MA (US)

(*) Notice: Subject to any disclaimer, the term of this patent is extended or adjusted under 35 U.S.C. 154(b) by 8 days.

(21) Appl. No.: 18/657,768

(22) Filed: May 7, 2024

(65) Prior Publication Data

US 2024/0289533 A1 Aug. 29, 2024

Related U.S. Application Data

(63) Continuation of application No. 18/197,696, filed on May 15, 2023, now Pat. No. 12,026,447, which is a continuation-in-part of application No. 17/452,236, filed on Oct. 26, 2021, now abandoned.

(60) Provisional application No. 63/198,495, filed on Oct. 23, 2020.

(51) Int. Cl.
| | |
|---|---|
| G06F 40/00 | (2020.01) |
| G06F 40/106 | (2020.01) |
| G06F 40/166 | (2020.01) |
| G06F 40/205 | (2020.01) |

(52) U.S. Cl.
CPC .......... G06F 40/106 (2020.01); G06F 40/166 (2020.01); G06F 40/205 (2020.01)

(58) Field of Classification Search
CPC ..... G06F 40/166; G06F 40/106; G06F 40/205
See application file for complete search history.

(56) References Cited

U.S. PATENT DOCUMENTS

| | | | | |
|---|---|---|---|---|
| 5,283,833 | A * | 2/1994 | Church | G10L 15/187 379/88.16 |
| 5,799,267 | A * | 8/1998 | Siegel | G09B 17/006 707/999.005 |
| 5,895,463 | A * | 4/1999 | Dowling | G06F 40/242 |
| 2002/0156776 | A1* | 10/2002 | Davallou | G06F 16/30 |
| 2003/0118973 | A1* | 6/2003 | Noble | G09B 19/04 434/167 |
| 2004/0133559 | A1* | 7/2004 | DeVorzon | G10H 1/0025 |

(Continued)

OTHER PUBLICATIONS

Hussein Hirjee, Daniel G. Brown, Cheriton School of Computer Science, University of Waterloo, Using Automated Rhyme Detection to Characterize Rhyming Style in Rap Music, Empirical Musicology Review, 25 pages, vol. 5, No. 4, 2010 (Year: 2010).*

(Continued)

*Primary Examiner* — Barbara M Level

(57) ABSTRACT

A rhyme engine generates hierarchical sets of imperfect rhymes by using the hierarchical relationship between consonants in a consonant family tree or chart to choose an order of consonant substitution for the perfect rhyme consonant that yields the best sounding imperfect rhymes first. Imperfect rhymes are broken down into at least four discrete levels of imperfect rhymes, starting with those based on the most closely related siblings of the perfect rhyme consonant. Words in which the stressed syllable to rhyme is not the last syllable can have their hierarchical sets of imperfect rhymes further broken down by substituting each right-most consonant individually, or the consonants in the right-most syllable, and then working to the left until the stressed syllable is reached.

10 Claims, 35 Drawing Sheets

(56) References Cited

U.S. PATENT DOCUMENTS

| | | | | |
|---|---|---|---|---|
| 2005/0273337 | A1* | 12/2005 | Erell | G10L 15/07 |
| | | | | 704/260 |
| 2015/0066921 | A1* | 3/2015 | Freimuth | G06F 40/268 |
| | | | | 707/730 |
| 2017/0109340 | A1* | 4/2017 | Chen | G06F 40/151 |
| 2019/0266250 | A1* | 8/2019 | Toplyn | G10L 15/26 |

OTHER PUBLICATIONS

B. Bay, P. Bodily and D. Ventura, "Dynamically Scoring Rhymes with Phonetic Features and Sequence Alignment," 2019 IEEE 31st International Conference on Tools with Artificial Intelligence (ICTAI), Portland, OR, USA, 2019, pp. 1581-1585, doi: 10.1109/ICTAI.2019.00228 (Year: 2019).*

Regular expression—Wikipedia, archived Oct. 15, 2020, 28 pages (Year: 2020).*

Hinton et al. How WSJ Used an Algorithm to Analyze 'Hamilton' the Musical, 4 pages, Jun. 7, 2016 (Year: 2016).*

Aparrish / gen-text-workshop, Allison Parrish, Assistant Arts Professor at ITP NYU. Creative writing with computation, Retrieved at https://github.com/aparrish/gen-text-workshop/blob/master/cmu_pronouncing_dictionary_notes.md, 5 pages, archived May 22, 2020. (Year: 2020).*

* cited by examiner

```
Verse1 Ln1: The grass is green
Verse1 Ln2: The sky is blue
Verse1 Ln3: Sugar is sweet
Verse1 Ln4: And you are too Chorus Ln1: Enjoy the band
Chorus Ln2: Musicians playing
Chorus Ln3: Couples swaying
Chorus Ln4: Lovely and grand Verse2 Ln1: Roses glow red
Verse2 Ln2: Lilies delight
Verse2 Ln3: Hair on your head
Verse2 Ln4: Blacker than night
```

FIG. 1 Sample Literary Work (Song) in Normal Layout

| RICH.TEXT | LN# | STZ# | STZ.LN# | LD.WHT | WHT.LNS | LVL (*) |
|---|---|---|---|---|---|---|
| Verse1 Ln1: The grass is green | 1 | 1 | 1 | 0 | 0 | 1 |
| Verse1 Ln2: The sky is blue | 2 | 1 | 2 | 0 | 0 | 1 |
| Verse1 Ln3: Sugar is sweet | 3 | 1 | 3 | 0 | 0 | 1 |
| Verse1 Ln4: And you are too | 4 | 1 | 4 | 0 | 0 | 1 |
|  | 5 | - | - | - | - | - |
| Chorus Ln1: Enjoy the band | 6 | 2 | 1 | 4 | 0 | 2 |
| Chorus Ln2: Musicians playing | 7 | 2 | 2 | 4 | 0 | 2 |
| Chorus Ln3: Couples swaying | 8 | 2 | 3 | 4 | 0 | 2 |
| Chorus Ln4: Lovely and grand | 9 | 2 | 4 | 4 | 0 | 2 |
|  | 10 | - | - | - | - | - |
| Verse2 Ln1: Roses glow red | 11 | 3 | 1 | 0 | 0 | 1 |
| Verse2 Ln2: Lilies delight | 12 | 3 | 2 | 0 | 0 | 1 |
| Verse2 Ln3: Hair on your head | 13 | 3 | 3 | 0 | 0 | 1 |
| Verse2 Ln4: Blacker than night | 14 | 3 | 4 | 0 | 0 | 1 |

```
(*) – LVL determined by uniqueness of:
    Timeline:  LD.WHT and WHT.LNS
    Overlay:   LD.WHT
    Fold:      LD.WHT
```

FIG. 2 Normal Layout Data Structure

```
init NormalData struct
clear BlankLineFlag
foreach line of Normal text
    increment LineNum (LN#)
    if line is blank
        set BlankLineFlag
        increment WhiteLineCount (WHT.LNS)
    else
        determine LeadingWhite (LD.WHT)
        if BlankLineFlag is set or LeadingWhite different than
                                  PrevLeadingWhite
            increment StanzaNum (STZ#)
            reset StanzaLineNum (STZ.LN#)
            if LeadingWhite not equal to PrevLeadingWhite
                reset WhiteLineCount (WHT.LNS)
        else
            increment StanzaLineNum (STZ.LN#)
        set PrevLeadingWhite to LeadingWhite
        clear BlankLineFlag
    store line data in NormalData
# update Levels (LVL) according to target Special mode
clear LevelArray
foreach entry in NormalData
    if SpecialMode is Timeline
        LevelPattern is LD.WHT combined with WHT.LNS
    else
        LevelPattern is LD.WHT
    if LevelPattern is not in LevelArray
        append LevelPattern to LevelArray
    set entry's Level (LVL) to index of LevelPattern in LevelArray
```

FIG. 3A Creating Normal Layout Data Structure

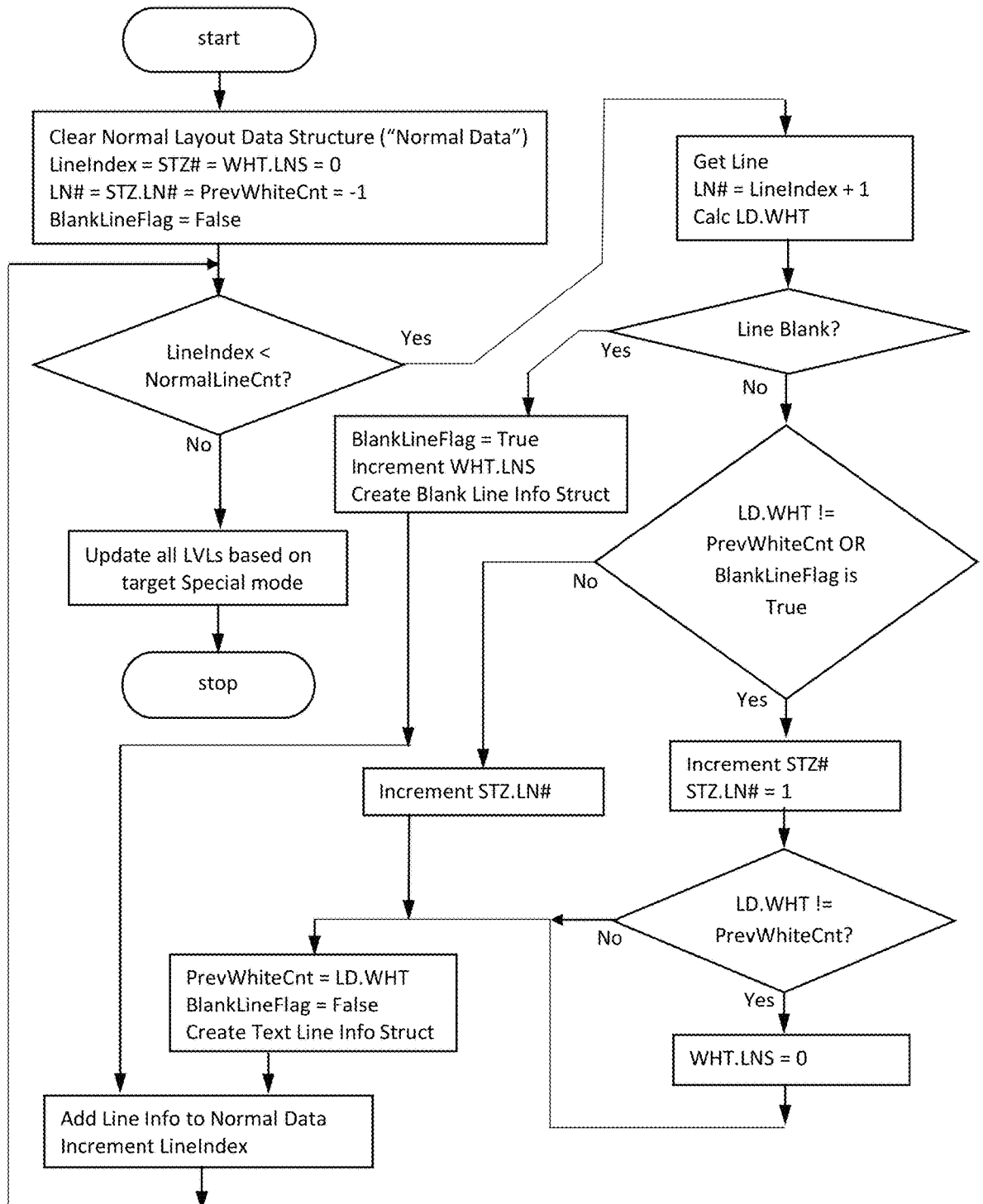
FIG. 3B Creating Normal Layout Data Structure

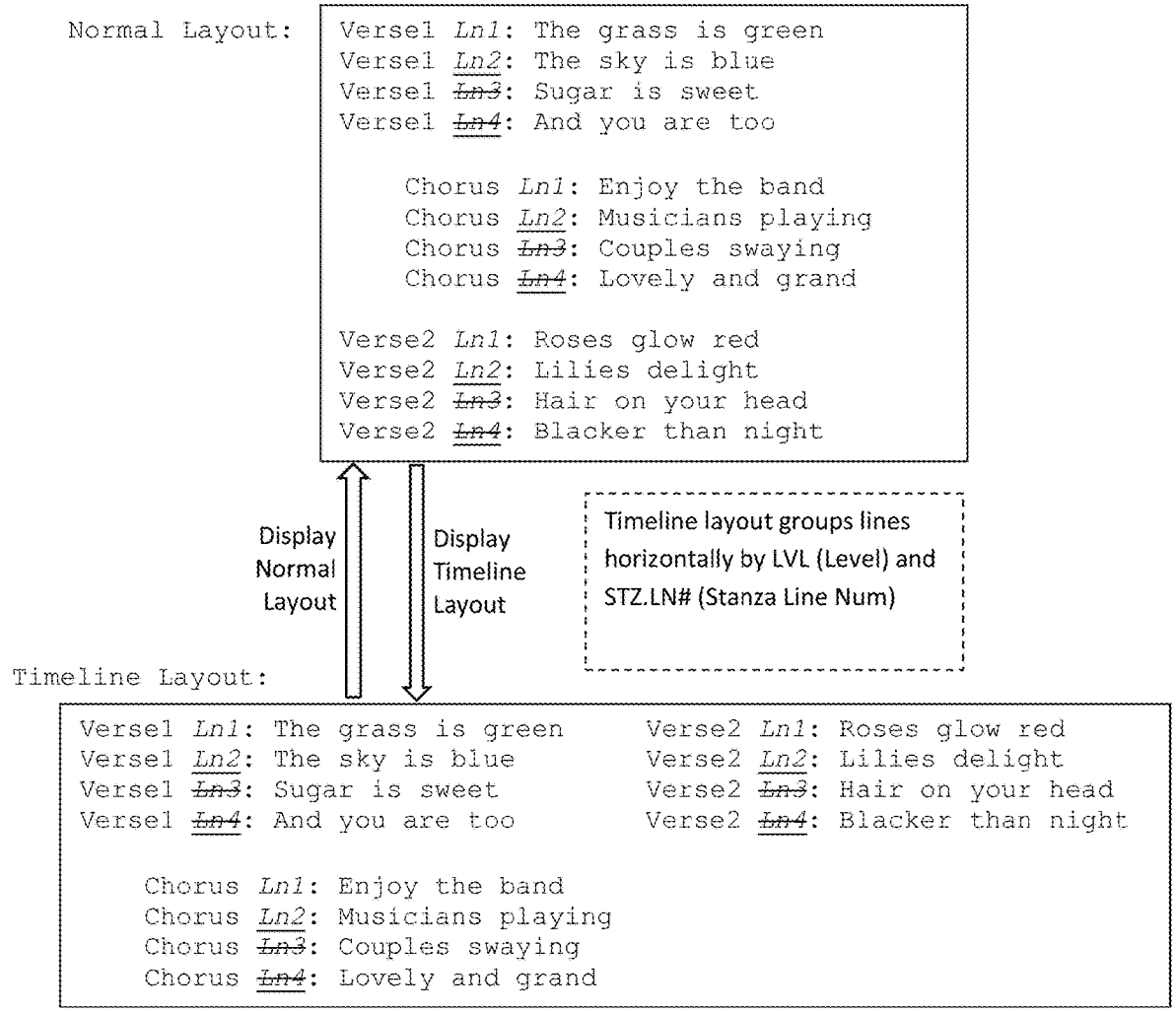
FIG. 4 Timeline Mode

```
create NormalData struct from Normal text
wipe Normal text
determine MaxLineLength and MaxPaddedLineLength
init FirstStanzaAtLevel struct
foreach entry in NormalData
    get Level (LVL) and StanzaNum (STZ#) of entry
    if FirstStanzaAtLevel has no value for Level
        add value pair for Level and StanzaNum
    if entry line is from first stanza at Level
        set position to OriginalLineNum of entry line
        insert line with leading white space and end padding at position
    else
        get OriginalLineNum of corresponding line in 1st stanza at Level
        set position to that OriginalLineNum
        append line with end padding at position
```

FIG. 5A Displaying Timeline Layout

```
create NormalData struct from Normal text
wipe Normal text
determine MaxLineLength and MaxPaddedLineLength
foreach level in unique levels of NormalData
    foreach stanza line in first stanza at level
        set OriginalLineNum from stanza line
        insert LeadingWhite (LD.WHT) at line OriginalLineNum
        foreach line in Original Lines
            if level and stanza line index match
                pad line to MaxPaddedLineLength
                append padded line following LeadingWhite
```

FIG. 5B Displaying Timeline Layout

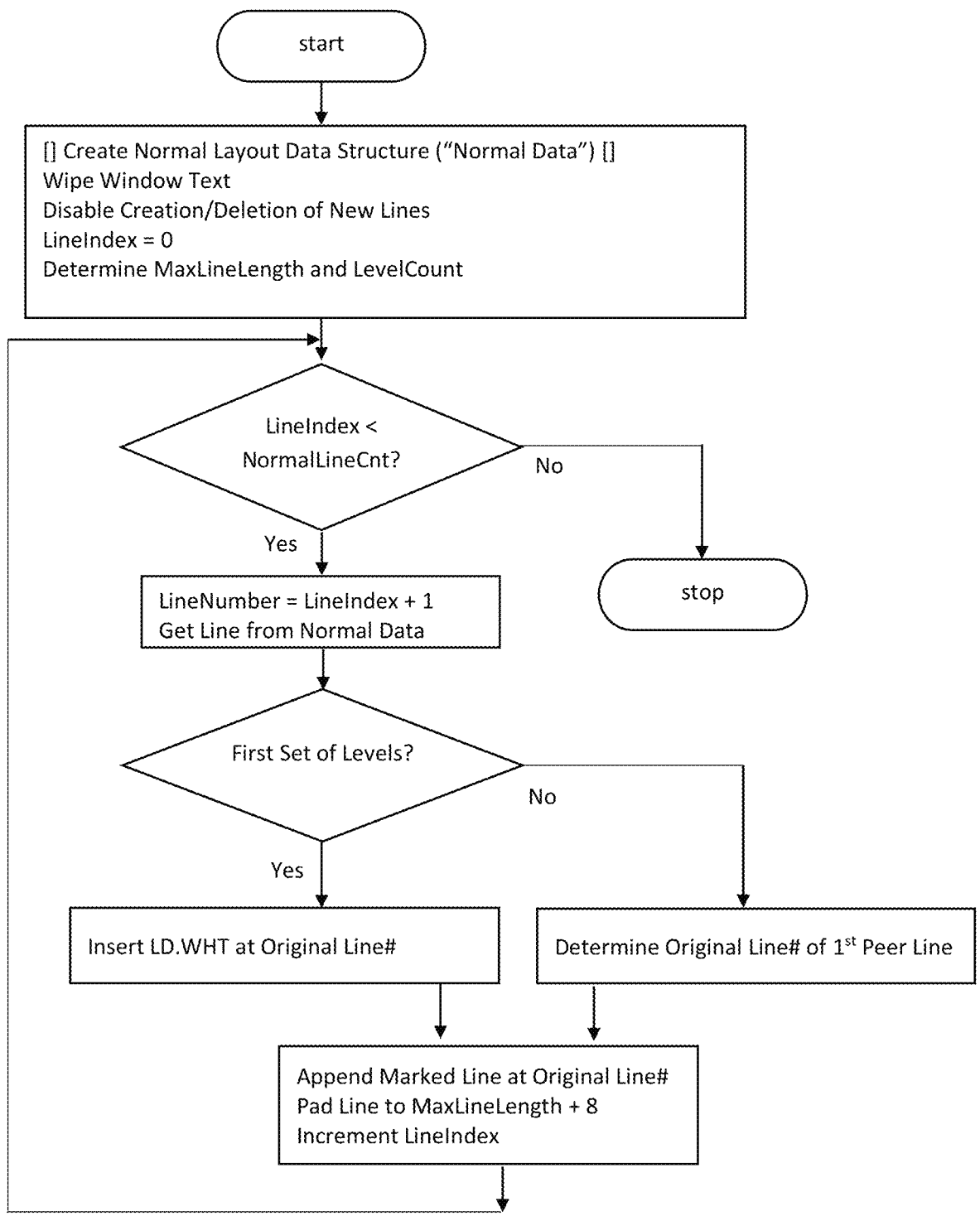
FIG. 5C Displaying Timeline Layout

```
verify NormalData struct
foreach entry in NormalData
    if entry line is blank
        do nothing
    else
        store updated line content from Special text
        erase line content from Special text
if there are any non-blank lines in Special text
    flag error
wipe Special text
foreach entry in NormalData
    insert entry white space (LD.WHT) as new line of text
    append entry line to same line
```

FIG. 6A Displaying Normal Layout

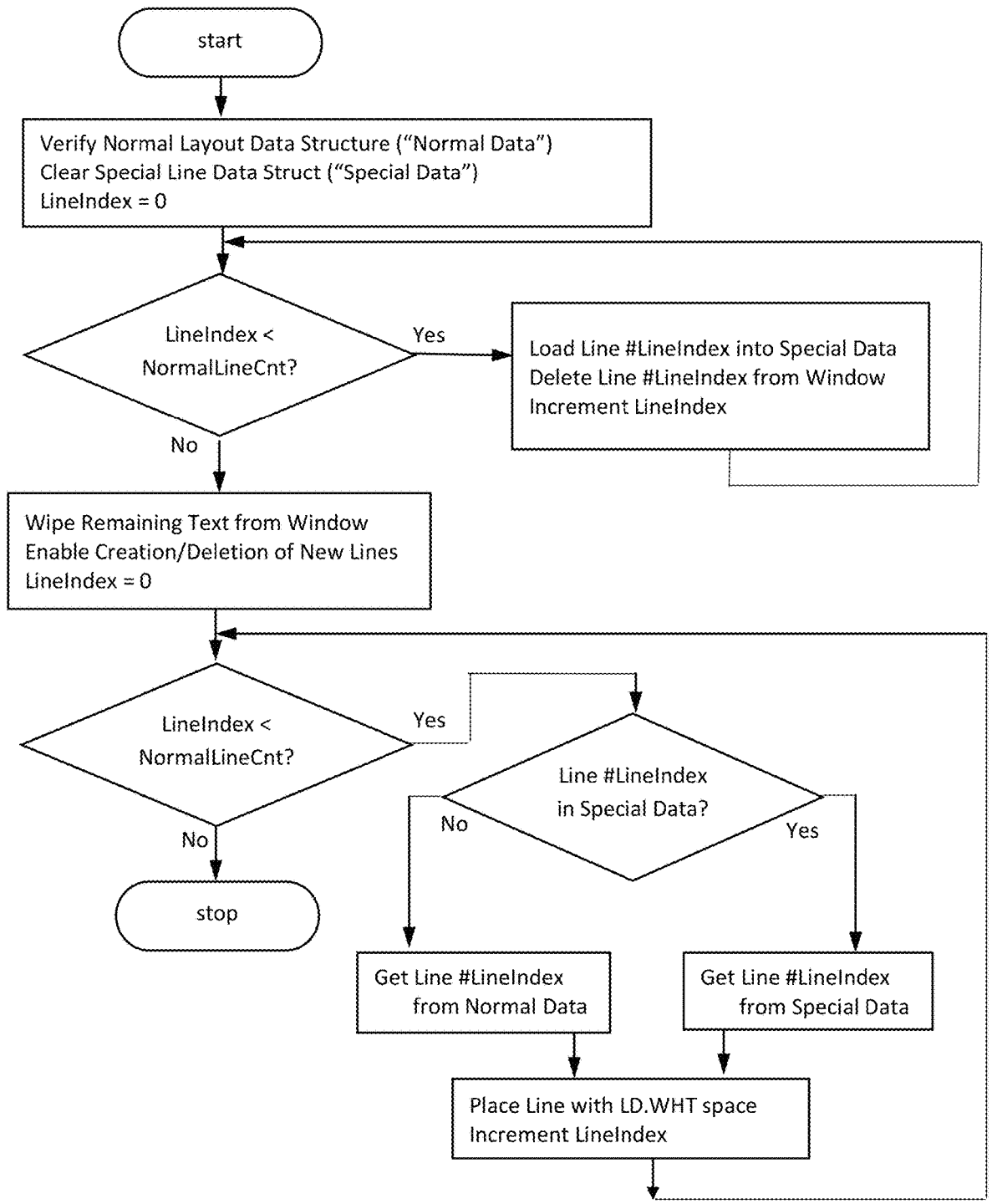
FIG. 6B Displaying Normal Layout

```
Normal Layout:   Verse1 Ln1: The grass is green
                 Verse1 Ln2: The sky is blue
                 Verse1 Ln3: Sugar is sweet
                 Verse1 Ln4: And you are too Chorus Ln1: Enjoy the band
                    Chorus Ln2: Musicians playing
                    Chorus Ln3: Couples swaying
                    Chorus Ln4: Lovely and grand Verse2 Ln1: Roses glow red
                 Verse2 Ln2: Lilies delight
                 Verse2 Ln3: Hair on your head
                 Verse2 Ln4: Blacker than night
```

Display Normal Layout ⬆

Display Overlay Layout ⬇

Overlay layout groups lines vertically by LVL (Level) and STZ.LN# (Stanza Line Num)

```
Overlay Layout:  Verse1 Ln1: The grass is green
                 Verse2 Ln1: Roses glow red Verse1 Ln2: The sky is blue
                 Verse2 Ln2: Lilies delight Verse1 Ln3: Sugar is sweet
                 Verse2 Ln3: Hair on your head Verse1 Ln4: And you are too
                 Verse2 Ln4: Blacker than night Chorus Ln1: Enter the band Chorus Ln2: Music playing Chorus Ln3: Couples swaying Chorus Ln4: Lovely and grand
```

FIG. 7 Overlay Mode

```
Normal Layout:  Verse1 Ln1: The grass is green
                Verse1 Ln2: The sky is blue
                Verse1 L̶n̶3̶: Sugar is sweet
                Verse1 L̶n̶4̶: And you are too Chorus Ln1: Enjoy the
                    Chorus Ln2: Musicians
                    Chorus L̶n̶3̶: Couples
                    Chorus L̶n̶4̶: Lovely and Verse2 Ln1: Roses glow red
                Verse2 Ln2: Lilies delight
                Verse2 L̶n̶3̶: Hair on your head
                Verse2 L̶n̶4̶: Blacker than night
```

Display Normal Layout ⇅ Display Fold Layout

```
Fold layout reorders lines within each stanza

Verse Rhyme Scheme = ABAB, Line #s 1234 →
    1A 2B 3A 4B → Fold Pattern = 1324
1324 Optimized to 2413 to favor last line 4

Chorus Rhyme Scheme = ABBA, Line #s 1234 →
    1A 2B 3B 4A → Fold Pattern 1423
1423 requires no last-line optimization Note: the above folds are by end rhyme
      scheme, but other schemes are possible.
```

```
Fold Layout:  Verse1 Ln2: The sky is blue
              Verse1 L̶n̶4̶: And you are too
              Verse1 Ln1: The grass is green
              Verse1 L̶n̶3̶: Sugar is sweet Chorus Ln1: Enjoy the
                  Chorus L̶n̶4̶: Lovely and
                  Chorus Ln2: Musicians
                  Chorus L̶n̶3̶: Couples Verse2 Ln2: Lilies delight
              Verse2 L̶n̶4̶: Blacker than night
              Verse2 Ln1: Roses glow red
              Verse2 L̶n̶3̶: Hair on your head
```

FIG. 8 Fold Mode

```
create NormalData struct from text for target Overlay mode
wipe Normal text
foreach level in unique levels of NormalData
    foreach stanza line in first stanza at level
        foreach entry in NormalData
            if level and stanza line index match
                append line incl. leading white sp
    append blank line
```

FIG. 9A Displaying Overlay Layout

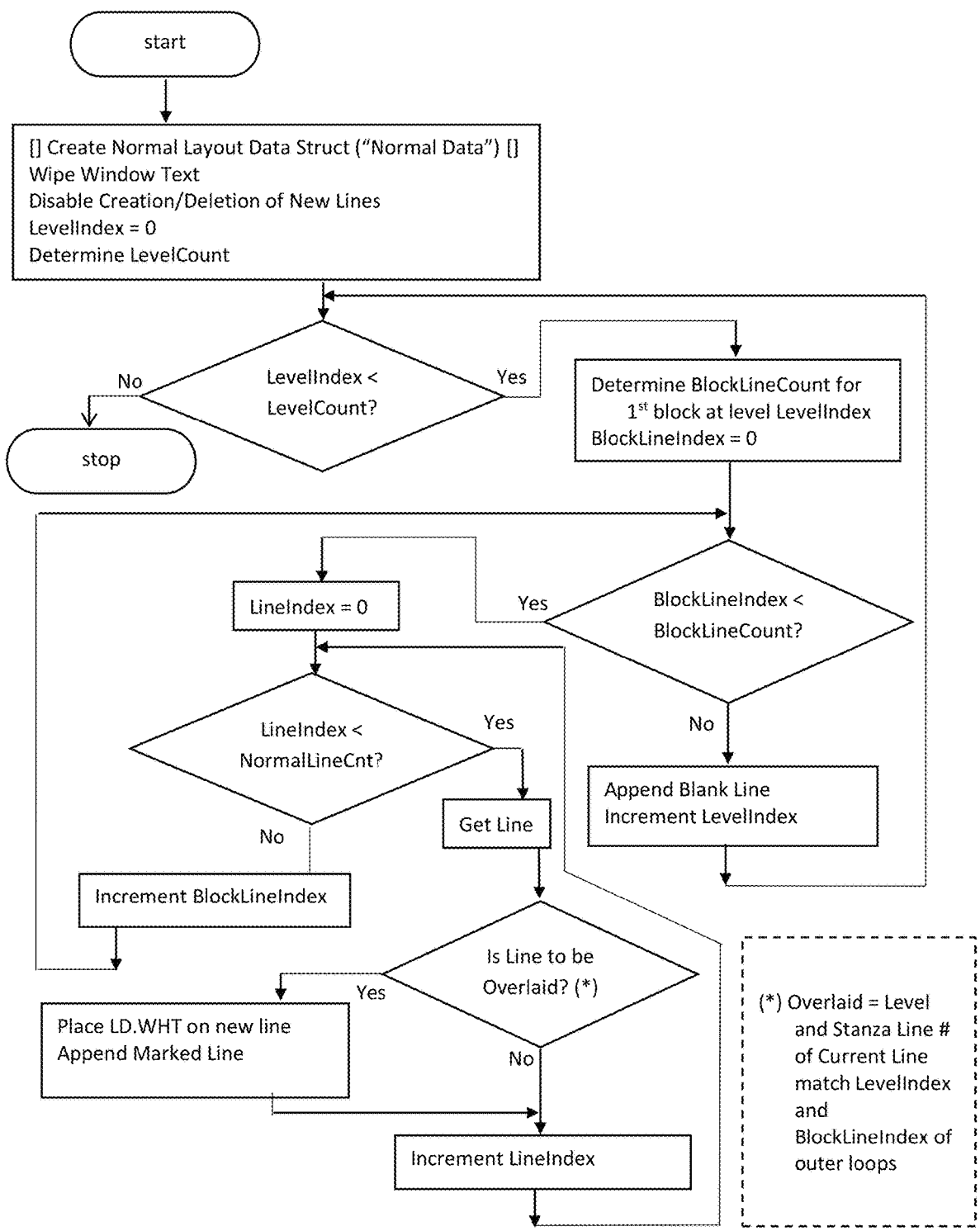
FIG. 9B Displaying Overlay Layout

```
create NormalDataStruct from text
wipe Normal text
foreach entry in NormalDataStruct
    if entry line is to be Folded (not blank and not comment/header)
        set position to OriginalLine# minus STZ.LN# plus one
                      plus FoldPattern Index of STZ.LN#
    else
        set position to OriginalLine#
    insert line at position incl. leading white sp
```

FIG. 10A Displaying Fold Layout

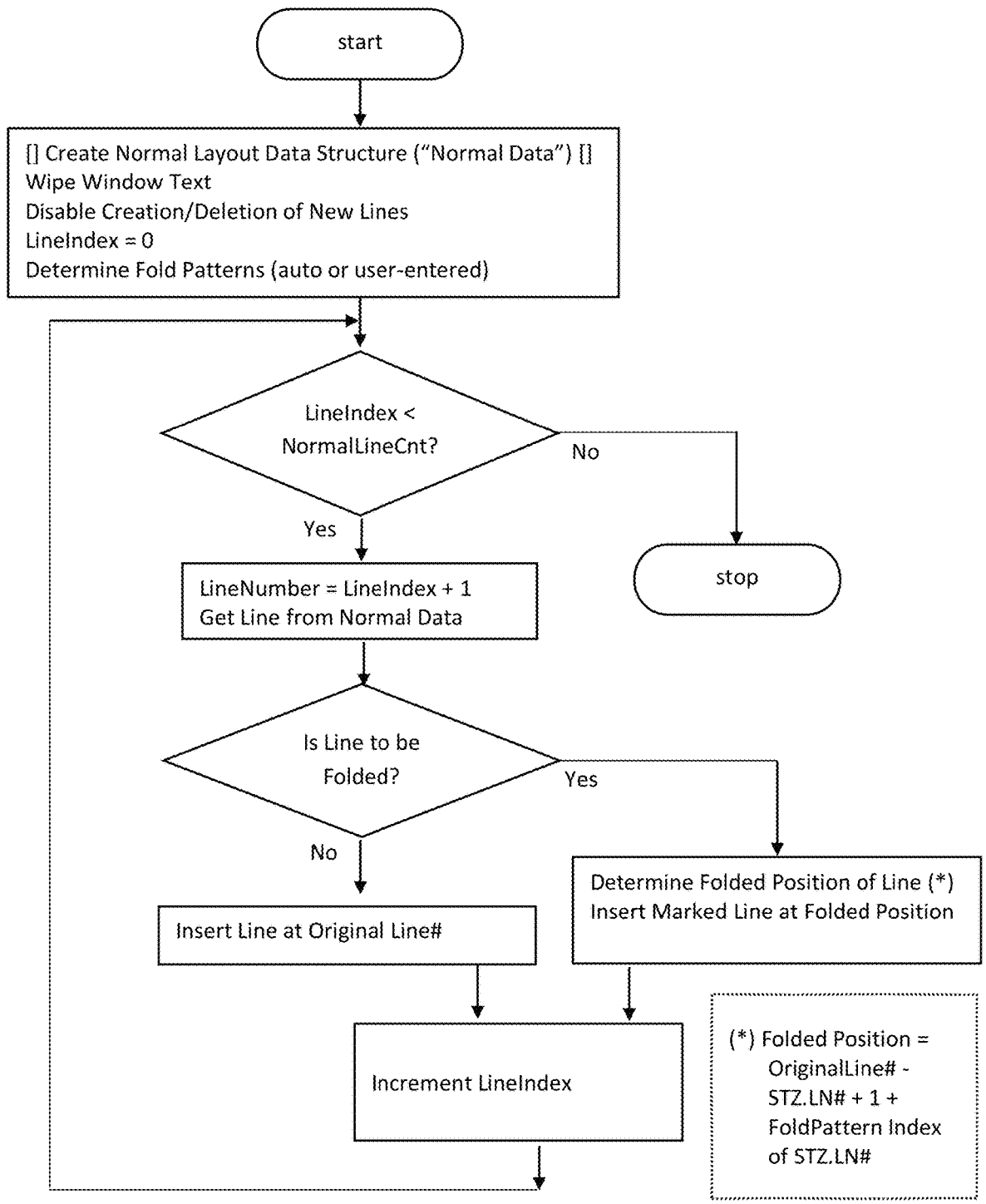
FIG. 10B Displaying Fold Layout

```
[] Create Normal Layout Data Structure ("Normal Data") []
Determine number of Levels from Normal Data
Determine default font family, size, type face, coloring, and borders
For each level in Levels
    For each line of first stanza at level
        Gather visual indications of last word
    If at least two, but less than all, match and differ from default
        Create Fold Information for level
```

FIG. 11 Determining Fold Patterns

| WORD | SYLLABLES LIBRARY | SYL CNT | PHONETICS LIBRARY | PHON EMPH /CNT | WORD WITH STRESSED SYLLABLES - Canonical & Visualized Forms |
|---|---|---|---|---|---|
| Chorus | Cho-rus | 2 | K AO1 R AH0 S | 1/2 | Cho1-rus0 Cho-rus |
| enjoy | en-joy | 2 | EH2 N JH OY1 | 21/2 | en2-joy1 en-joy |
| the | the | 1 | DH AH0 \| DH AH1 \| DH IY0 | 0/1 | the0 the |
| band | band | 1 | B AE1 N D | 1/1 | band1 band |
| musicians | mu-si-cians | 3 | M Y UW0 Z IH1 SH AH0 N Z | 2/3 | mu0-sil-cians0 mu-si-cians |
| playing | play-ing | 2 | P L EY1 IH0 NG | 1/2 | play1-ing0 play-ing |

FIG. 12 Canonicalization from Syllables and Phonetics Libraries

```
For each syllable position across list of phonetics entries
    If all positional syllables have stress of "1"
        Positional MergedStress is "1"
    Else if any positional syllables have stress of "0"
        Positional MergedStress is "0"
    Else
        MergedStress is "2"
```

FIG. 13 Merging Stress from Multiple Phonetics Library Entries

```
Clear PhoneticEmphasis
For each vowel position in phonetics entry
    If positional vowel has stress of "1"
        Prepend position to PhoneticEmphasis
    Else if positional vowel has stress of "2"
        Append position to PhoneticEmphasis
If PhoneticEmphasis is cleared
    Set PhoneticEmphasis to "0"
```

FIG. 14 Determining Phonetic Emphasis

|   | MULTIPLE WORD ENTRIES | PHONETICS ENTRY | First Vowel Stress | Second Vowel Stress |
|---|---|---|---|---|
| 1 | ADVERSE (1st entry) | AE0 D V ER1 S | 0 | 1 |
| 2 | ADVERSE (2nd entry) | AE1 D V ER2 S | 1 | 2 |
| 3 | ADVERSE (3rd entry) | AE2 D V ER1 S | 2 | 1 |
| 4 | (merging) |  | Merge(0, 1, 2) = 0 | Merge(1, 2, 1) = 2 |
| 5 | ADVERSE (merged) | AE0 D V ER2 S | 0 | 2 |

FIG. 15 Merged Stress Example

```
GET Word
Set WordSyllables to Word
Clear StressedVowelPositions
If Word in SyllablesLib
    Set WordSyllables to entry from SyllablesLib
    Determine SyllablesCount
    If Word in PhoneticsLib
        Get List of Phonetics for Word
        If List is longer than one
            Merge multiple list items into single Phonetics entry
        Set VowelCount according to phonetics
        If SyllablesCount equal to VowelCount
            For each position in SyllablesCount
                Append VowelStress to position of WordSyllables
RETURN WordSyllables
```

FIG. 16 Canonicalizing Word with Syllables Stress

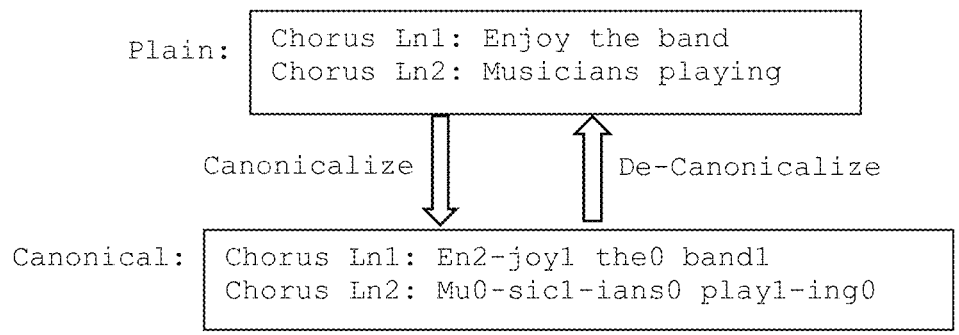
FIG. 17 Canonical Mode
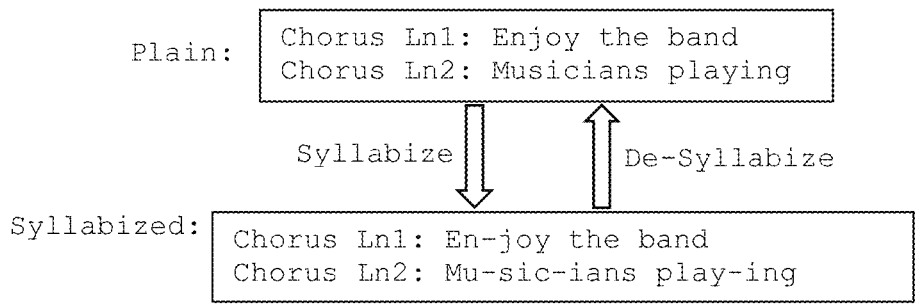
FIG. 18 Syllables Mode
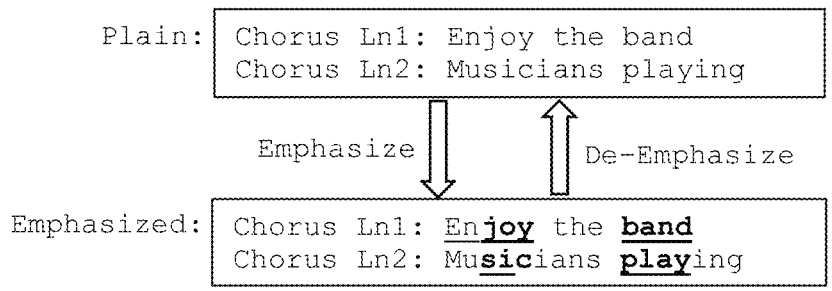
FIG. 19 Emphasis Mode
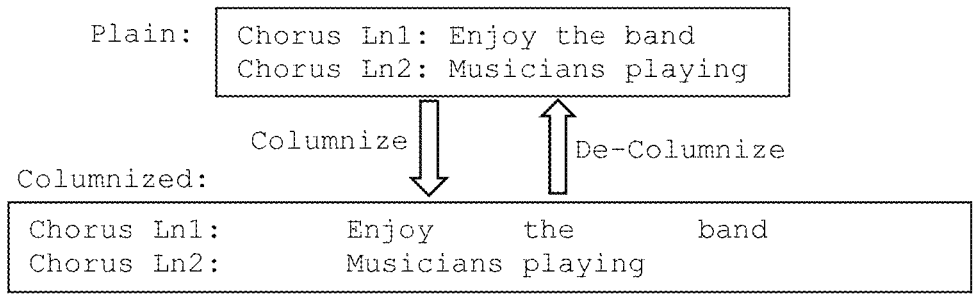
FIG. 20 Columns Mode

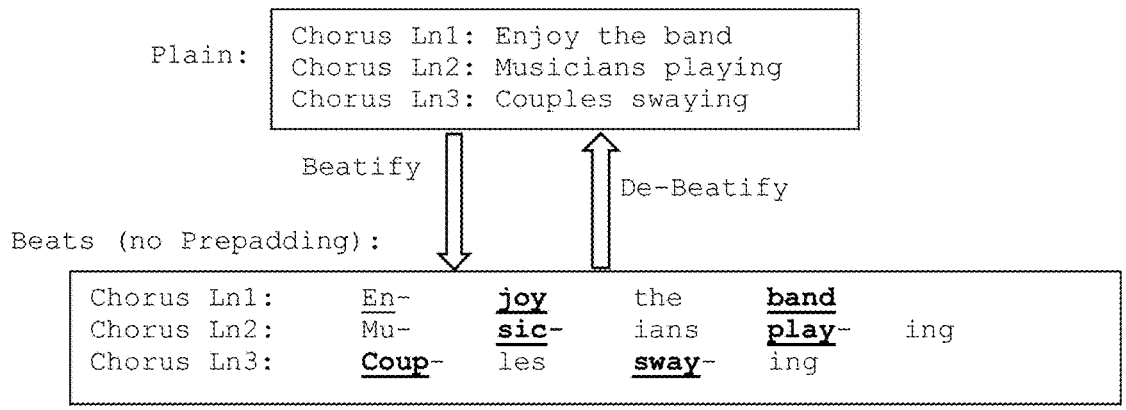
FIG. 21 Beats Mode (No Prepadding)
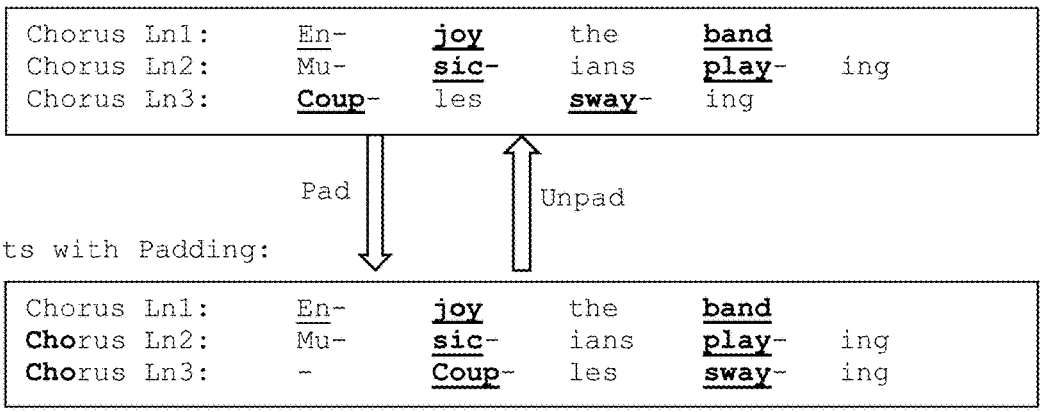
FIG. 22A Beats Padding
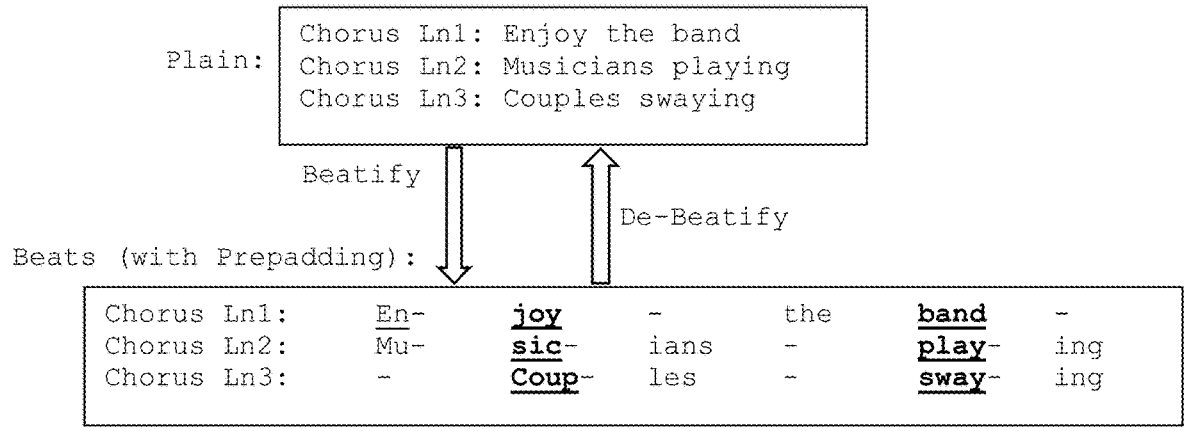
FIG. 22B Beats Mode (with Prepadding)

```
Normal Layout:   Verse1 Ln1: The grass is green
                 Verse1 Ln2: The sky is blue
                 Verse1 Ln3: Sugar is sweet
                 Verse1 Ln4: And you are too Chorus Ln1: Enjoy the band
                 Chorus Ln2: Musicians playing
                 Chorus Ln3: Couples swaying
                 Chorus Ln4: Lovely and grand Verse2 Ln1: Roses glow red
                 Verse2 Ln2: Lilies delight
                 Verse2 Ln3: Hair on your head
                 Verse2 Ln4: Blacker than night
```

⇅ Display Fold Mode and Beatify

```
Fold Layout with Beats
(no Prepadding):

Verse1 Ln2:      The        sky       is       blue
Verse1 Ln4:      And        you       are      too
Verse1 Ln1:      The        grass     is       green
Verse1 Ln3:      Su-        gar       is       sweet Chorus Ln1:      En-        joy       the      band
   Chorus Ln4:      Love-      ly        and      grand
   Chorus Ln2:      Mu-        sic-      ians     play-     ing
   Chorus Ln3:      Coup-      les       sway-    ing Verse2 Ln2:      Li-        lies      de-      light
Verse2 Ln4:      Black-     er        than     night
Verse2 Ln1:      Ro-        ses       glow     red
Verse2 Ln3:      Hair       on        your     head
```

FIG. 23A Fold Mode with Beats (No Prepadding)

```
Normal Layout:   Verse1 Ln1: The grass is green
                 Verse1 Ln2: The sky is blue
                 Verse1 Ln3: Sugar is sweet
                 Verse1 Ln4: And you are too Chorus Ln1: Enjoy the band
                 Chorus Ln2: Musicians playing
                 Chorus Ln3: Couples swaying
                 Chorus Ln4: Lovely and grand Verse2 Ln1: Roses glow red
                 Verse2 Ln2: Lilies delight
                 Verse2 Ln3: Hair on your head
                 Verse2 Ln4: Blacker than night
```

⇕ Display Fold Mode and Beatify

Fold Layout with Beats (with Prepadding):

```
Verse1 Ln2:     The       sky      -      is      blue     -
Verse1 Ln4:     And       you      -      are     too      -
Verse1 Ln1:     The       grass    -      is      green    -
Verse1 Ln3:     -         Su-      gar    is      sweet    -

Chorus Ln1: En-        joy      -      the     band     -
   Chorus Ln4: -          Love-    ly     and     grand    -
   Chorus Ln2: Mu-        sic-     ians   -       play-    ing
   Chorus Ln3: -          Coup-    les    -       sway-    ing Verse2 Ln2:     -         Li-      lies   de-     light    -
Verse2 Ln4:     -         Black-   er     than    night    -
Verse2 Ln1:     -         Ro-      ses    glow    red      -
Verse2 Ln3:     -         Hair     on     your    head     -
```

FIG. 23B Fold Mode with Beats (with Prepadding)

```
          Normal:  Verse1 Ln1: The grass is green
                   Verse1 Ln2: The sky is blue
                   Verse1 Ln3: Sugar is sweet
                   Verse1 Ln4: And you are too Chorus Ln1: Enjoy the band
                   Chorus Ln2: Musicians playing
                   Chorus Ln3: Couples swaying
                   Chorus Ln4: Lovely and grand Verse2 Ln1: Roses glow red
                   Verse2 Ln2: Lilies delight
                   Verse2 Ln3: Hair on your head
                   Verse2 Ln4: Blacker than night
```

⇕ Display Overlay Mode and Beatify

Overlay Layout with Beats (no Prepadding):

| Verse1 Ln1: | The   | grass | is   | green |       |
|---|---|---|---|---|---|
| Verse2 Ln1: | Ro- | ses    | glow | red   |       |
|             |       |        |          |           |       |
| Verse1 Ln2: | The   | sky  | is   | blue  |       |
| Verse2 Ln2: | Li- | lies   | de-      | light |       |
|             |       |        |          |           |       |
| Verse1 Ln3: | Su- | gar    | is   | sweet |       |
| Verse2 Ln3: | Hair | on | your | head  |       |
|             |       |        |          |           |       |
| Verse1 Ln4: | And   | you  | are  | too   |       |
| Verse2 Ln4: | Black- | er  | than     | night |       |
|             |       |        |          |           |       |
| Chorus Ln1: | En-   | joy  | the      | band  |       |
| Chorus Ln2: | Mu-   | sic- | ians     | play- | ing   |
| Chorus Ln3: | Coup- | les | sway- | ing      |       |
| Chorus Ln4: | Love- | ly  | and      | grand |       |

FIG. 24A Overlay Mode with Beats (No Prepadding)

```
                    Normal: Verse1 Ln1: The grass is green
                            Verse1 Ln2: The sky is blue
                            Verse1 Ln3: Sugar is sweet
                            Verse1 Ln4: And you are too Chorus Ln1: Enjoy the band
                            Chorus Ln2: Musicians playing
                            Chorus Ln3: Couples swaying
                            Chorus Ln4: Lovely and grand Verse2 Ln1: Roses glow red
                            Verse2 Ln2: Lilies delight
                            Verse2 Ln3: Hair on your head
                            Verse2 Ln4: Blacker than night ⇕  Display
                                            Overlay
                                            Mode and
Overlay Layout with Beats                   Beatify
(with Prepadding):

Verse1  Ln1:     The      grass    -        is       green    -
Verse2  Ln1:     -        Ro-      ses      glow     red      -

Verse1  Ln2:     The      sky      -        is       blue     -
Verse2  Ln2:     -        Li-      lies     de-      light    -

Verse1  Ln3:     -        Su-      gar      is       sweet    -
Verse2  Ln3:     -        Hair     on       your     head     -

Verse1  Ln4:     And      you      -        are      too      -
Verse2  Ln4:     -        Black-   er       than     night    -

Chorus Ln1:        En-      joy      -        the      band     -

Chorus Ln2:        Mu-      sic-     ians     -        play-    ing

Chorus Ln3:        -        Coup-    les      -        sway-    ing

Chorus Ln4:        -        Love-    ly       and      grand    -
```

FIG. 24B Overlay Mode with Beats (with Prepadding)

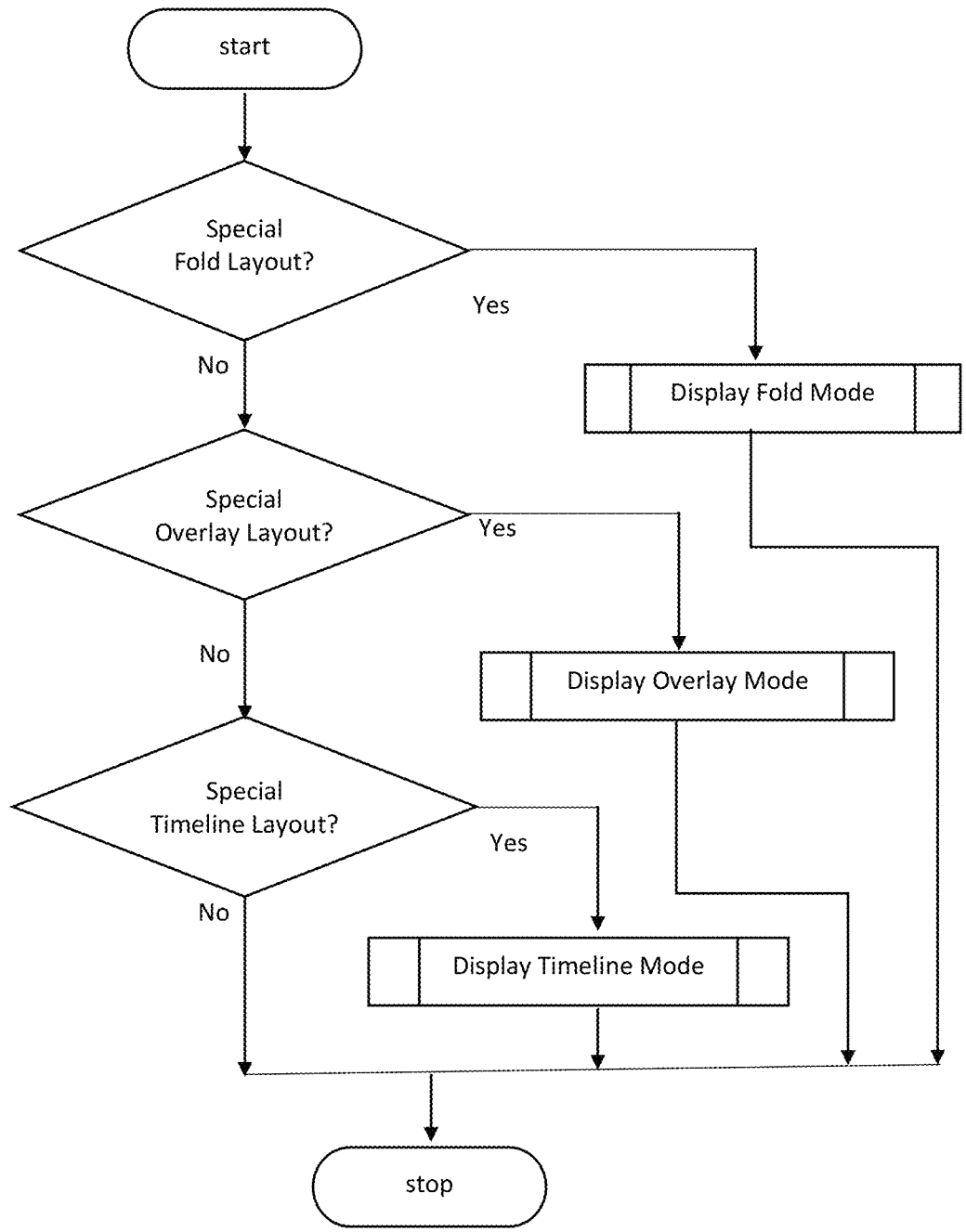
FIG. 25 Displaying Special Layout

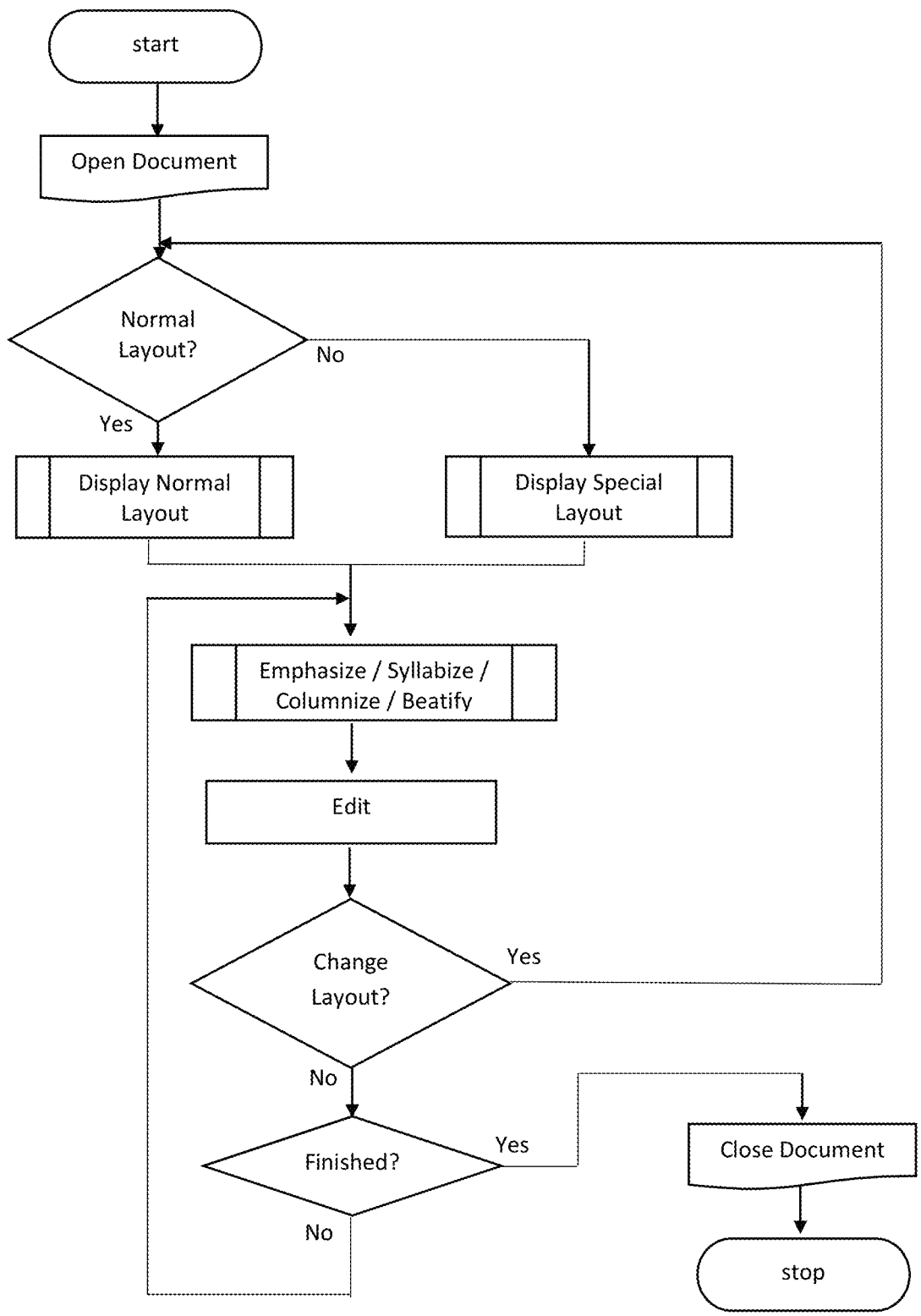
FIG. 26 Master Flowchart

```
NEW SONG TITLE
© 2020 John Doe
= = = = = = = = = = = = = = = = = =
This is Verse1 Ln1 bee
This is Verse1 Ln2 cry
This is Verse1 Ln3 dope
This is Verse1 Ln4 fly {Chorus}
    This is Chorus Ln1 buy
    This is Chorus Ln2 NEW SONG TITLE
    This is Chorus Ln3 due
    This is Chorus Ln4 NEW SONG TITLE This is Verse2 Ln1 bow
This is Verse2 Ln2 cue
This is Verse2 Ln3 drat
This is Verse2 Ln4 few <Chorus>

{Bridge}
        This is Bridge Ln1 bat
        This is Bridge Ln2 cat

<Chorus>
```

FIG. 27 Templated Text Display

FIG. 28 Templated Text Wizard

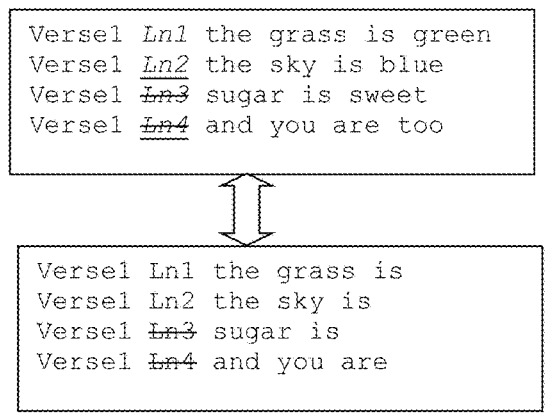

FIG. 29 Sample Text with End Rhyme Detection and Indication

```
Clear list of words
For each line in stanza
    Grab LastWord of line
    If LastWord rhymes with any word in list
        If dynamic visual indication scheme supported
            Grab RhymeVowel of LastWord
            If there is no visual indication scheme for RhymeVowel
                Prompt for visual indication scheme for RhymeVowel
                Store visual indication scheme for RhymeVowel
        Visually indicate LastWord and last word of matching list line
    Add LastWord to list
```

FIG. 30 Detecting End Rhymes

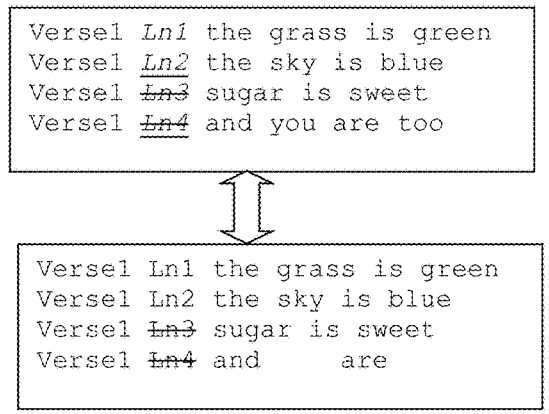

FIG. 31 Sample Text with Internal Rhyme Detection and Indication

```
For each line to be processed
    Clear list of words
    For each word in line
        If word rhymes with any word in list
            If dynamic visual indication scheme supported
                Grab RhymeVowel of word
                If there is no visual indication scheme for RhymeVowel
                    Prompt for visual indication scheme for RhymeVowel
                    Store visual indication scheme for RhymeVowel
            Visually indicate word and rhyming word from list
        Add word to list
```

FIG. 32 Detecting Internal Rhymes

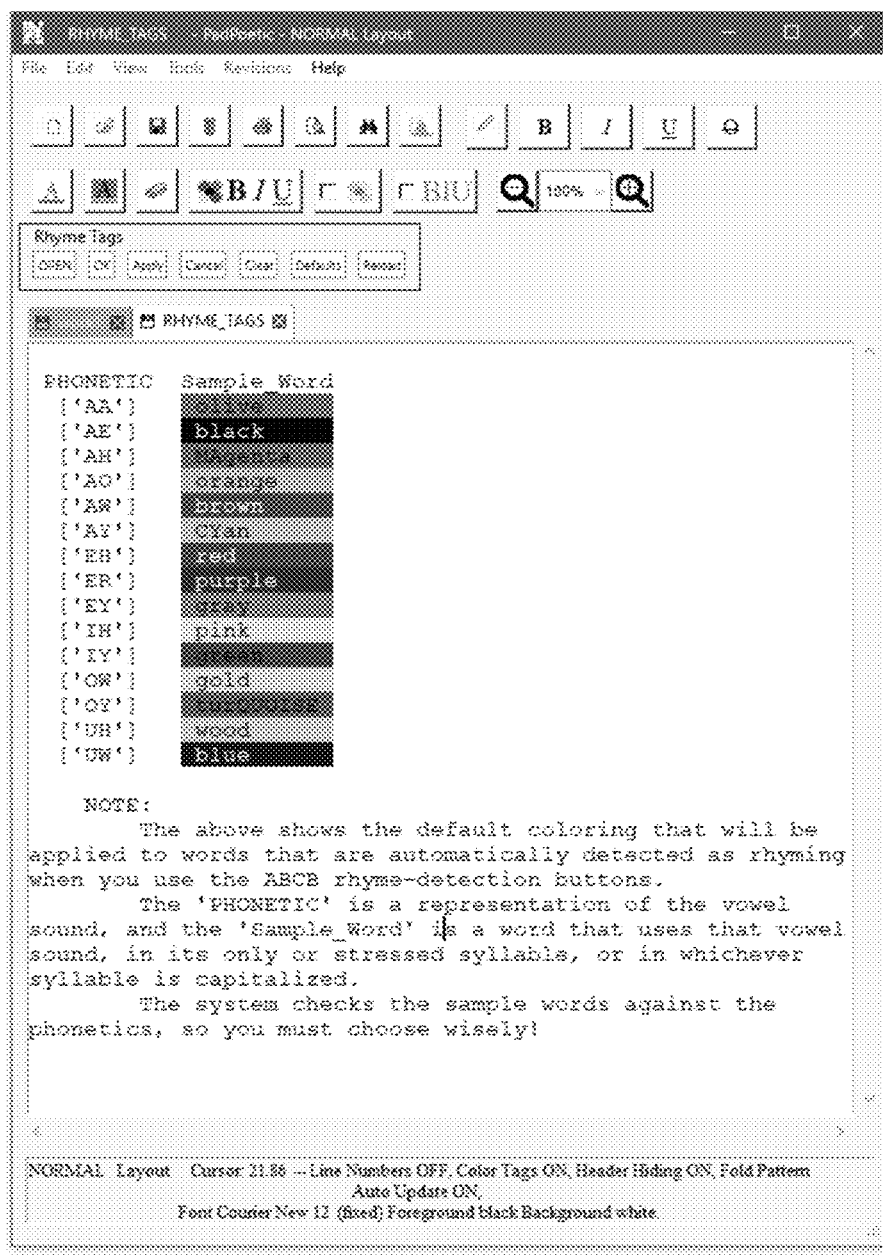
FIG. 33 Chart of Rhyme Detection Colorization

```
Clear RhythmicLineRepresentations list
For each line to be processed
    Convert each word of the line into Canonical form
    Combine VowelStress values from Canonical forms into LineRhythmRep
    For each word of line that has been tagged with prepadded beats
        Insert "0" for each prepadded beat accordingly into LineRhythmRep
Append LineRhythmRep to RhythmicLineRepresentations
If matching is relaxed for VowelStress values
    Allow "2" to match either "1" or "0" ("2" becomes a don't-care)
If matching is relaxed for leading/trailing beats
    Ignore any leading and trailing "0"s when matching
Look for numeric string matches in RhythmicLineRepresentations
If configured to do so
    Visually indicate, uniquely, each set of rhythm-matching lines
```

FIG. 34 Detecting Rhythm Match

| OBSTRUENTS - obstructed air flow | | | |
|---|---|---|---|
| | Plosives = Explosion | | |
| | | Voiced | B, D, G |
| | | Voiceless | P, T, K |
| | Affricates = plosive + fricative | | |
| | | Voiced | J |
| | | Voiceless | CH |
| | Fricatives = air flows | | |
| | | Voiced | V, DH(th), Z, ZH |
| | | Voiceless | F, TH, S, SH, H |
| SONORANTS - no air flow (like vowels) (all Voiced) | | | |
| | Nasals | | |
| | | M, N, NG | |
| | Approximants | | |
| | | Liquids (often have several pronunciations or "allophones") | |
| | | | L, R |
| | | Glides - artic position glides (semi-vowels) | |
| | | | W, Y |

FIG. 35 Rhyme Engine - Consonant Family Tabular Chart

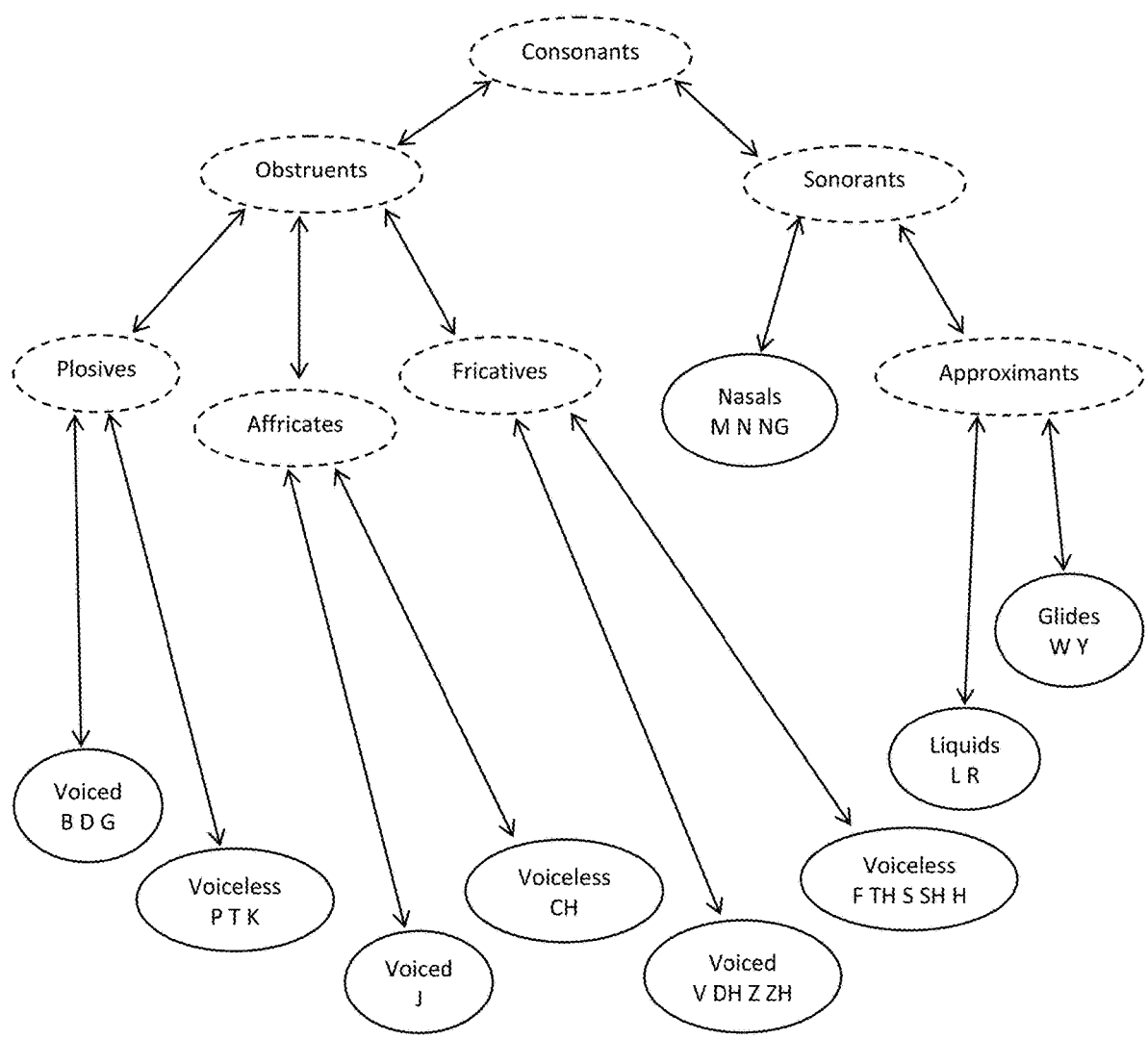
FIG. 36 Rhyme Engine - Consonant Family Tree Diagram

```
WORD TO RHYME:
            BED (ends in Voiced Plosive "D")

TIERED RHYMES IN DECREASING RHYME PERFECTION

Perfect: perfect rhyme, ending in Voiced Plosive "D"
     dead, Ed, fed, head, led, Ned, red, said, Ted, wed Tier 1: imperfect rhyme, ending in other Voiced Plosives (B, G)
     Deb, ebb, egg, keg, leg, neg, peg, web Tier 2: imperfect rhyme, ending in Voiceless Plosive (K, P, T)
     deck, debt, get, heck, let, set, wept, wet, wreck Tier 3: imperfect rhyme, ending in Affricates (J, CH) and Fricatives
(DH, V, Z, ZH, F, TH, S, SH, H)
     edge, hedge, ledge, pledge, wedge
     etch, fetch, ketch, retch, stretch, wretch
     dev, rev, says, Zev
     deaf, death, guess, less, ref, Seth, Steph Tier 4: imperfect rhyme, ending in Sonorants (M, N, NG, L, R, W, Y)
     cell, hem, hen, men, sell, spell, stem, tell Note: the above lists of rhymes are exemplary, not exhaustive.
```

FIG. 37 Rhyme Perfection Example for Tree-Based Method

| Start | Plosive (V or VL) | Affricate (V or VL) | Fricative (V) | Fricative (VL) | Nasal | Liquid | Glide |
|---|---|---|---|---|---|---|---|
| Tier 1 | Plosives (same v) | Affricate (other v) | Fricatives (same v) | Fricatives (same v) | Nasals | Liquids | Glides |
| Tier 2 | Plosives (other v) | Plosives (same v) | Approximants | Nasals | Liquids | Nasals | Liquids |
| Tier 3 | Affricates (same v) | Plosives (other v) | Nasals | *Fricatives (other v)* | Glides | Glides | Nasals |
| Tier 4 | Affricates (other v) | Fricatives (same v) | Fricatives (other v) | Affricates | Fricatives (V) | Fricatives (V) | Fricatives |
| Tier 5 | Fricatives (same v) | Fricatives (other v) | Affricates | Approximants | Fricatives (VL) | Fricatives (VL) | Affricates |
| Tier 6 | Fricatives (other v) | SONORANTS | Plosives | Plosives | Affricates | Affricates | Plosives |
| Tier 7 | SONORANTS | | | | Plosives | Plosives | |

```
Notes:
  V = Voiced
  VL = Voiceless
  same v = same voicing
  other v = other voicing
```

FIG. 38 Rhyme Engine – Consonant Search Paths

```
WORD TO RHYME:
              BED (ends in Voiced Plosive "D")

TIERED RHYMES IN DECREASING RHYME PERFECTION

Perfect: perfect rhyme, ending in Voiced Plosive "D"
     dead, Ed, fed, head, led, Ned, red, said, Ted, wed Tier 1: imperfect rhyme, ending in other Voiced Plosives (B, G)
     Deb, ebb, egg, keg, leg, neg, peg, web Tier 2: imperfect rhyme, ending in Voiceless Plosive (K, P, T)
     deck, debt, get, heck, let, set, wept, wet, wreck Tier 3: imperfect rhyme, ending in Voiced Affricate (J)
     edge, hedge, ledge, pledge, wedge Tier 4: imperfect rhyme, ending in Voiceless Affricate (CH)
     etch, fetch, ketch, retch, stretch, wretch Tier 5: imperfect rhyme, ending in Voiced Fricative (DH, V, Z, ZH)
     dev, rev, says, Zev Tier 6: imperfect rhyme, ending in Voiceless Fricative (F, TH, S, SH, H)
     deaf, death, guess, less, ref, Seth, Steph Tier 7: imperfect rhyme, ending in Sonorant (M, N, NG, L, R, W, Y)
     cell, hem, hen, men, sell, spell, stem, tell Note: the above lists of rhymes are exemplary, not exhaustive.
```

FIG. 39 Rhyme Perfection Example for Search Paths-Based Method

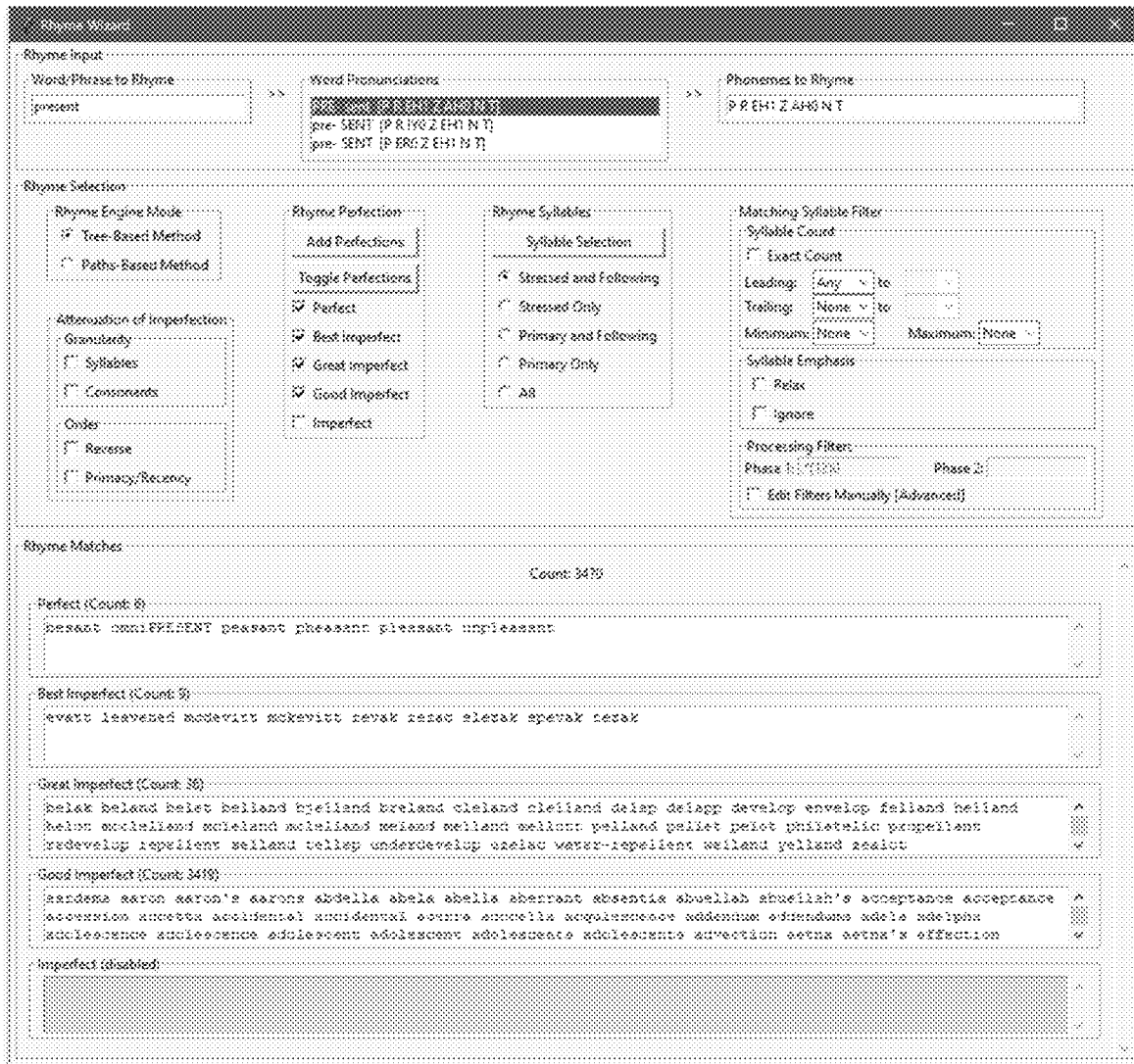
FIG. 40 Rhyme Wizard

RHYME ENGINE FOR LITERARY WORKS WITH RHYME OR RHYTHM

CROSS-REFERENCE TO RELATED APPLICATIONS

The present application claims the benefit of U.S. Nonprovisional patent application Ser. No. 18/197,696, filed May 15, 2023, which is incorporated by reference herein in its entirety. Nonprovisional patent application Ser. No. 18/197,696 claims the benefit of U.S. Nonprovisional patent application Ser. No. 17/452,236, filed Oct. 26, 2021, which is incorporated by reference herein in its entirety. Application Ser. No. 17/452,236 further claims the benefit of U.S. Provisional Patent Application No. 63/198,495, filed Oct. 23, 2020, which is incorporated by reference herein in its entirety.

BACKGROUND OF THE INVENTION

(1) Field of the Invention

The present invention relates to text editing software, and more specifically to text editing software for use with literary works with rhyme or rhythm or both, such as songs or poems.

(2) Description of Related Art

Text editing software programs ("text editors") allow for the creation and modification of text files. Some text editors support plain text. Other text editors support rich text, which allows for the combination of multiple text fonts, including families, sizes, styles, and colors.

Certain literary works, such as songs and poems, involve rhyme and rhythm. Such works are usually divided into different sections, or stanzas. Certain stanzas often share common patterns of rhyme or rhythm. A simple song example may contain four stanzas: a verse, a chorus, a second verse, and a second chorus. The rhyme and rhythm of the two verses will likely be very similar, while the rhyme and rhythm of the two choruses will likely be similar or identical. However the rhyme and rhythm of the verses will likely be dissimilar from the rhyme and rhythm of the choruses. This dissimilarity makes the song more interesting.

Rhyme is based on phonetic sounds and stresses, and it refers to similar sounds near the ends of two or more words. Repetition of similar vowel sounds is typically referred to as assonance. Repetition of similar consonant sounds is referred to as consonance. Perfect rhyme occurs between two words when (1) the stressed vowel sound in both words is identical, as are any subsequent sounds, and (2) the onset of the stressed syllable in the words is different. Examples include head & red, and caring & daring. Word pairs that satisfy the first condition but not the second form an identical rhyme. Examples include gun & begun, and deal & ideal. Rhymes that do not qualify as perfect rhymes are said to be imperfect rhymes. Imperfect rhymes occur when the stressed vowel sound in both words is identical, but the subsequent sounds are not identical. Examples include ace & bake, and cap & chat. Pararhyme is an alternate form of rhyme in which the stressed vowel sound differs but all other sounds are identical. Examples include hip & hop, and pitter & patter. Some text editors include simple rhyme engines capable of generating a list of words that are a perfect rhyme for a selected word. Perfect rhymes sound pleasing, but they can be predictable, which makes the work less interesting.

Rhymes may occur in different places in a literary work. End rhyme occurs when the last word or words in one line rhyme with the last word or words in another line, usually but not always within the same stanza. Internal rhyme occurs when two or more words in the same line rhyme with each other.

Rhythm is the strong, regular repeated pattern of sound that results from a sequence of stressed and unstressed syllables and pauses in words. Rhythm and variations in rhythm also make a literary work interesting.

Authors of literary works written with rhyme and rhythm often use rhyme or rhythm patterns which they intend to repeat across different lines and different stanzas of the work. In a song, the rhyme scheme of the first verse is most likely the same as the rhyme scheme in all subsequent verses. Similarly the author may intend to repeat the rhythm of one line in a stanza with another line in the same stanza or with a peer line in a different stanza.

(3) Problems in the Art

There are numerous challenges facing an author of literary works with rhyme or rhythm. These challenges can affect the author's ability to write works that possess consistent rhyme schemes and consistent rhythm patterns. Proper analysis and verification of rhyme and rhythm is unsupported in text editors.

One major challenge comes from comparing lines for common rhyme and rhythm when those lines are not adjacent. Such lines are often separated by intervening lines, sometimes by intervening stanzas. Comparing such non-adjacent lines makes the process more difficult and can lead to error or oversight. The lines to be compared can be manually transposed to be adjacent to one another during comparison, and then they can be manually moved back to their original positions, but this is cumbersome and prone to error. This becomes more apparent as the number of lines to transpose increases.

A second major challenge in comparing lines for common rhyme and rhythm is doing so without any visual indication as to rhymes and rhythms. Most written works are written in plain text, with no visual indication of which words rhyme, or which syllables are emphasized so as to indicate rhythm. This requires the author to mentally track rhyming words and the rhythm of the words to be compared. Alternatively the author can manually add such visual indication of rhyme and rhythm, and he can manually remove such visual indication, but this is also cumbersome and prone to error.

A third major challenge comes from the generic layout of a work. Given a list of stanzas without any visual indication as to which stanzas are peers (i.e. which stanzas are verses, choruses, bridges), the general structure of the work can be hard to understand. Editing such a work can lead to unintended results, such as unintentionally changing the rhyme or rhythm scheme between peer stanzas so that they no longer adhere to the same scheme. Readers of the work may also struggle to understand the general structure of the work, causing confusion and making them reluctant to want to read the work.

A fourth major challenge facing more inexperienced authors of literary works with rhyme or rhythm is lack of understanding the basic format of such a work. Songs and poems tend to have some basic structure. For example, songs tend to be comprised of verses, choruses, bridges, etc., often in a certain order. An author new to writing songs may not be familiar with this format. Without guidance, the new song author struggles with how to begin writing a song. Additionally, an experienced song author may have an idea for part of a new song but does not want to start writing on a blank page.

A fifth major challenge when creating rhyming works is choosing rhyming words that both sound pleasing and are interesting. Existing rhyme engines produce lists of perfect rhymes, which sound pleasant, but often such rhymes are predictable and cliché, which makes the work less interesting. Such engines do not consider imperfect rhymes or other types of rhymes. The author is deprived of the full list of rhymes from which to choose to keep his work both pleasant-sounding and interesting.

The above challenges have existed in the art as long-felt, unmet needs and have remained unaddressed for too long. The present invention addresses all these challenges and solves all these problems.

SUMMARY OF THE INVENTION

The present invention provides a solution to the above problems by disclosing a text editing program which addresses each of the unmet needs described above. Embodiments of the invention vary by implementation detail and programming language.

A primary object of the present invention is to provide means for displaying visual indication as to how the stanzas in a work relate to one another. The invention achieves this using two different layouts. In the first layout, or "Normal" layout, stanzas appear in their original order. "Peer stanzas" are logically-related stanzas which are intended to have the same rhythm or rhyme scheme, and peer stanzas are visually indicated in a common way. For example, peer stanzas may share a common colored border or background, a common font coloring or styling, or they may be indented by the same amount. For example, all the verses are most likely peer stanzas. The choruses most likely constitute a set of peer stanzas, but the choruses are not peer stanzas of the verses. If the work has pre-chorus stanzas, they most likely constitute yet another set of peer stanzas. But if the work has only one bridge, the bridge has no peer stanzas. In one embodiment, the first stanza and its peers are indented by the same amount, possibly with little or no indentation. Later peer stanza groups are usually indented more than previous stanza groups. In the second layout, or "Timeline" layout, peer stanzas appear side-by-side to one another. The first stanza of each peer stanza group still appears as in the Normal layout, but later peer stanzas appear to the right of the first stanza of their group, in chronological order. So, the Normal layout is read top-to-bottom, while the Timeline layout is read both top-to-bottom and left-to-right.

A second object of the present invention is to provide means for displaying "Special" layouts for a literary work with rhyme and rhythm. The Special layouts involve juxtaposing lines of text in the Normal layout so that certain non-adjacent lines are shown as adjacent to one another. Those lines can be shown as adjacent in the Special layout, edited, and then shown again in their original non-adjacent locations back in the Normal layout, with no extra effort by the author. "Peer lines" are the corresponding numerical position lines of each peer stanza group. For example, for a work with two verses and a chorus, the two verses are peer stanzas, and the first line of the first verse and the first line of the second verse are peer lines. Similarly, the second line of the first verse and the second line of the second verse are peer lines, and the second line of the first verse would be a peer line of the second line of the second verse. However, the first line of the first verse will not be a peer line to the second line of the second verse, because they are in different numerical positions. In other words, all the first lines of the stanzas in a peer stanza group form a set of peer lines, all the second lines of the stanzas in a peer stanza group form a set of peer lines, and so on.

The Timeline layout above qualifies as a Special layout, since lines of text are being juxtaposed. In particular, peer lines are horizontally juxtaposed to be side-by-side. So, the first line of the second stanza in a peer stanza group is shown to the right of the first line of the first stanza in the peer stanza group, and so on. In short, the Timeline layout involves placing peer stanzas and peer lines side-by-side.

Another Special layout is the "Overlay" layout, in which the peer lines of each peer stanza group may be shown as vertically adjacent. So, the first line of the first stanza in a peer group may be shown directly above and adjacent to the first line of the second stanza in the peer group, and so on. This allows the rhyming scheme or rhythmic pattern of lines across stanzas to be compared. In short, the Overlay layout involves vertically grouping peer lines.

Another Special layout is the "Fold" layout. In the Fold layout, non-adjacent lines within a stanza may be shown as vertically adjacent. So, in a stanza where the first and third lines rhyme, and the second and fourth lines rhyme, the lines of the stanza can be reordered to group the first and third lines together, as well as the second and fourth lines together. This reordering of the lines of the stanza allows the rhyming scheme or rhythmic pattern of desired lines within the stanza to be compared. In short, the Fold layout involves reordering the lines of each individual stanza so that certain lines within the one stanza are grouped together. Importantly, the same reordering pattern is performed on each stanza in the stanza group, allowing for consistency checking.

A third object of the present invention is to provide a means for temporary visual indication of rhymes and rhythms. Rhyme may be indicated by showing rhyming words with matching visual indication, such as the same font coloring or font styling. To indicate rhythm, words can be "canonicalized" by employing syllables information and phonetics information to generate a canonical form of each word which includes the division into syllables and the relative stress, if any, of each syllable. The canonical form allows words to be expanded into syllables, or "syllabized." Those syllables can be visually indicated as stressed and unstressed syllables, or "emphasized," to show the difference in emphasis between syllables. Emphasized syllables can be divided into columns, or "columnized," with each syllable residing in a separate column. Some columns will hold emphasized syllables while other columns will not, thereby representing a pause or musical rest.

"Beatification" is the process of splitting words into syllables, visually indicating the syllables with emphasis, and dividing the syllables into columns, where some columns may be empty to represent a pause. With such columnized, emphasized syllables, also known as "beats," comparison of rhythm between lines is facilitated. To "beatify" text means to convert it into beats. Any line can be "beatified," or modified to visually indicate beats. Thus, "beatification" is simply the process of beatifying text. Beatified text lines can be effectively compared for rhythm. Beatified text lines, when put into the Special layouts above, allows the rhythm of non-adjacent lines to be effectively compared. Beatified text lines can be "unbeatified" by removing the visual indication of beats. Note that "beatify,"

"beatification," and the like are all pronounced with the word "beat" as a single syllable.

The temporary visual indication of rhymes and rhythms can be performed manually by the author or automatically by the invention. Automation of the temporary visual indication is achieved by algorithms which parse the text in different chunks to detect certain commonalities in rhyme or rhythm. For example, to detect end rhyme, each stanza is examined individually to see which lines, if any, end with rhyming words; peer lines in peer stanzas may also be compared for such end rhymes. To detect internal rhyme, each line of text is examined individually and checked for rhyming words. Commonalities in word count, stressed syllable count, rhythmic pattern and the like are detected in the same manner as end rhyme: by examining the lines of each individual stanza, but also comparing peer lines of peer stanzas.

A fourth object of the present invention is to allow population of templated text into the text editor window by means of a user-friendly visual tool. This simplifies the writing process for newer authors unfamiliar with the format of a literary work with rhyme or rhythm. Authors can use the tool to visually select the basic song structure to use as a starting point. It also serves as a tool for experienced authors who wish to quickly begin working on a particular portion of a work without having to manually populate the entirety of the work text. The populated templated text will be in the Normal layout and will comply with the primary object of the present invention.

A fifth object of the present invention is to provide a tiered selection of output rhymes which includes both perfect and imperfect rhymes. The perfect rhymes form the first tier, and the imperfect rhymes are organized into subsequent tiers, organized by decreasing phonetic similarity to the source input, based on the consonants and consonant families. The resolution of the tiers can be further heightened by examining the phonetic similarity of the rhymes in stages rather than all at once. The rhymes can also be refined by comparison of the stressed syllable patterns. Further, the present invention supports rhyme input as a single word, a phrase of multiple words, or a set of pure phonetics. Output rhymes can be single words or phrases of multiple words. Pararhymes are also supported, including a special mode for generating output pararhyme pairs when the input is also a pararhyme pair.

BRIEF DESCRIPTION OF THE SEVERAL VIEWS OF THE DRAWINGS

FIG. 1 depicts a sample literary work in Normal layout.

FIG. 2 depicts a table showing a Normal layout data structure.

FIG. 3A depicts pseudocode for creating a Normal layout data structure.

FIG. 3B depicts a flowchart for creating a Normal layout data structure.

FIG. 4 depicts a sample literary work in Timeline mode.

FIG. 5A depicts pseudocode for displaying a literary work in Timeline layout.

FIG. 5B depicts pseudocode for displaying a literary work in Timeline layout.

FIG. 5C depicts a flowchart for displaying a literary work in Timeline layout.

FIG. 6A depicts pseudocode for displaying a literary work in Normal layout.

FIG. 6B depicts a flowchart for displaying a literary work in Normal layout.

FIG. 7 depicts a sample literary work in Overlay mode.

FIG. 8 depicts a sample literary work in Fold mode.

FIG. 9A depicts pseudocode for displaying a literary work in Overlay layout.

FIG. 9B depicts a flowchart for displaying a literary work in Overlay layout.

FIG. 10A depicts pseudocode for displaying a literary work in Fold layout.

FIG. 10B depicts a flowchart for displaying a literary work in Fold layout.

FIG. 11 depicts pseudocode for automatically determining Fold Patterns.

FIG. 12 depicts a chart of canonicalization samples.

FIG. 13 depicts pseudocode for merging stress from multiple phonetics library entries.

FIG. 14 depicts pseudocode for determining phonetic emphasis.

FIG. 15 depicts a merged stress example.

FIG. 16 depicts pseudocode for canonicalizing a word with syllables stress.

FIG. 17 depicts sample text in Canonical mode.

FIG. 18 depicts sample text in Syllables mode.

FIG. 19 depicts sample text in Emphasis mode.

FIG. 20 depicts sample text in Columns mode.

FIG. 21 depicts sample text in Beats mode without prepadding.

FIG. 22A depicts sample text showing Beats Mode with padding.

FIG. 22B depicts sample text showing Beats Mode with prepadding.

FIG. 23A depicts a sample literary work in Fold Mode with Beats without prepadding.

FIG. 23B depicts a sample literary work in Fold Mode with Beats with prepadding.

FIG. 24A depicts a sample literary work in Overlay Mode with Beats without prepadding.

FIG. 24B depicts a sample literary work in Overlay Mode with Beats with prepadding.

FIG. 25 depicts a flowchart for displaying a literary work in a Special layout.

FIG. 26 depicts a master flowchart for editing a literary work.

FIG. 27 depicts an example of templated text.

FIG. 28 depicts a screen shot of the new song wizard.

FIG. 29 depicts an example of end rhyme detection and indication.

FIG. 30 depicts pseudocode for detecting end rhymes.

FIG. 31 depicts an example of internal rhyme detection and indication.

FIG. 32 depicts pseudocode for detecting internal rhymes.

FIG. 33 depicts a chart of visual rhyme indication colorization.

FIG. 34 depicts pseudocode for detecting rhythm matches.

FIG. 35 depicts a tabular chart of consonant families for rhyme engine use.

FIG. 36 depicts a tree diagram of consonant families for rhyme engine use.

FIG. 37 depicts an example of rhyme engine output for tree-based method.

FIG. 38 depicts a table showing consonant search paths for rhyme engine use.

FIG. 39 depicts an example of rhyme engine output for search paths-based method.

FIG. 40 depicts a screen shot of the Rhyme Wizard.

DETAILED DESCRIPTION OF THE INVENTION

FIG. 1 depicts a sample literary work in Normal layout. In particular, a sample song consisting of three stanzas is shown. Each stanza is separated by a blank line. Of the three stanzas, the first and third are verses, and the second is a chorus. For demonstrative purposes, each line of the two sample verses begins with "Verse1" and "Verse2" respectively. Similarly, each line of the chorus begins with "Chorus." Following the first word stanza designation of each line is an indicator of the stanza line number: Ln1, Ln2, or. For demonstrative purposes, each stanza line indicator is visually distinct from the others using a combination of italics, underlining, and strikethrough font styling. The visual indication of each line indicator is unique to facilitate comparisons and expose functionality in the instant document.

The two verses are separated by the chorus. The verses are not indented, but the chorus is indented by four spaces, visually indicating a difference between the chorus and the verses. Peer stanzas in Normal layout must be logically grouped for later display in Special layouts. In one embodiment of the invention, logical grouping of stanzas into different "levels" occurs automatically based upon the white space surrounding the stanzas. In the instant case, the two verses are "peers," or "peer stanzas," and are logically grouped together, because both verses have the same indentation of zero spaces and are therefore considered to be at the same "level." The chorus has no peers, because it is the only stanza with indentation of four spaces. This literary sample therefore has two logical groupings: the two verses with no indentation, and the chorus with indentation of four spaces. If there were another stanza indented to zero spaces, it would be considered a peer to the verses, and there would still be two logical groupings. If there were another stanza indented to four spaces, it would be considered a peer to the chorus, and there would still be two logical groupings. If there were yet another stanza indented by a different amount, say eight spaces for a bridge, then that bridge stanza would represent a different logical grouping, and there would be three logical groupings The author can work with the indentation-based logical grouping algorithm by modifying the white space of and around existing stanzas. Existing works can be imported and edited according to the author's intent. A block of text lines can be logically separated into stanzas by either inserting blank lines, varying the indentation of some of the text lines, or both. In another embodiment of the invention, the author can override the white space-based logical grouping of stanzas by manually identifying groupings of stanzas. He can manually indicate which stanzas are peers by selecting them and marking them as peers using a user-selectable visual indication of font, style, or border. Possible indications include colored backgrounds; colored borders; font family, style, or size; as well as other possibilities.

It is understood that the variation of indentation between different stanza groups is somewhat arbitrary and can vary greatly. One author might use tab characters to indent certain stanzas of her work while another author might choose space characters. One author might indent the first stanza and its grouped peers while another author may not do so. One author might indent each further level by an additional two spaces, while another author might choose to indent each further level by an additional eight spaces. The actual amounts of indentation may vary according to the author's aesthetic preference.

FIG. 2 depicts a table showing a Normal layout data structure. In particular, the table shows one possible embodiment of the data structure created by parsing the sample literary work of FIG. 1 while the work is in the standard, Normal layout. This Normal layout data structure ("NormalData") is employed by the invention to (1) generate different Special layouts, and (2) return to the Normal layout from any Special layout. The first column of the table, "RICH.TEXT", contains the rich text of each line of the literary work, including any font or color formatting, but without any leading white space. The second column, "LN #", contains the line number of the original work. The third column, "STZ #", contains the stanza number of the original work, starting at 1. The fourth column, "STZ.LN #", contains the line number within that particular stanza, starting from 1. The fifth column, "LD.WHT", contains the number of leading white spaces at the beginning of the line and so represents indentation. The sixth column, "WHT.LNS", contains the number of blank lines since the first stanza in an adjacent group of stanzas indented by the same amount. The seventh column, "LVL", contains the white space-based logical grouping of stanzas as described above and is dependent upon the targeted Special layout.

Stanzas are typically separated by blank lines but may also be delineated by a change in indentation (LD.WHT). Commonly, stanzas are delineated by both intervening blank lines and change in indentation. A change in indentation, with or without accompanying blank lines, indicates separation between two non-logically-grouped stanzas. Blank lines without a change in indentation indicate separation between logically-grouped stanzas. When logically-grouped stanzas are separated only by blank lines, the WHT.LNS values become non-zero for the later stanza. So, any stanza which has a WHT.LNS value of non-zero indicates that it is a peer with the immediately-preceding stanza.

By default, the LVL values in the Normal layout data structure will be automatically determined based on other column values. The Special layout to be entered determines which column values will be used. For Timeline layout, the LD.WHT and WHT.LNS input values are used. For Overlay and Fold layouts, only the LD.WHT values are used. LVL values start at 1 and increment for each unique set of input values. This is done most easily by making a pass through the entire Normal layout data structure, once all the Normal text lines have been processed, to update the LVL values accordingly. However, the author can override this default behavior by manually indicating the logical groupings of stanzas.

FIG. 3A depicts pseudocode for creating a Normal layout data structure. In one embodiment of the invention, the Normal layout data structure ("NormalData") is at the heart of the invention and allows for reformatting of the Normal layout text lines into the desired Special layouts. In that embodiment, after some initialization, each line of the Normal layout is processed, and an entry is made into NormalData. Lines that include only white space are considered blank lines. Blank lines delineate stanzas. Lines that have viewable characters are considered to be non-blank. Stanzas consist of consecutive, non-blank lines that have the same level of indentation. Therefore, a stanza may be delineated in two different ways. The first way of delineation is by a blank line, which means that the previous non-blank line was the last line of the previous stanza, and the next non-blank line begins a new stanza. The second way of delineation is by change in indentation, which means that the previous non-blank line at the last indentation level is the last line of the previous stanza, and the current non-blank line at the new indentation level is the first line of a new stanza. Note that the second way is not visually appealing and should be accompanied by and preceded with a blank line which serves to make the delineation visually appealing.

Note that in another embodiment of the invention, only blank lines delineate stanzas. A change of indentation without one or more accompanying blank lines would not constitute a stanza delineation. This difference may sometimes be desirable to the author.

The presented pseudocode represents one embodiment of the invention. The pseudocode parses through each line of the Normal layout text. For each line, the line number indicator (LN #) is incremented. Each line is parsed to determine if it is blank or not. Blank lines have only white space characters. If a line is blank, then BlankLineFlag is set, indicating that at least one blank line has been found, and the WhiteLineCount (WHT.LNS) is incremented, in case the next stanza should be at the same indentation level as the previous stanza. The latter occurs when a literary work has two or more consecutive stanzas separated by at least one blank line but indented to the same amount, such as consecutive verses.

If the line is non-blank, a text line of a stanza is being processed. First, the amount of leading white space (LD.WHT) is determined. If the previous line was a blank line or the amount of leading white space between the instant line and the previous non-blank line has changed, the line is treated as the first line of a new stanza. This means incrementing the number of the stanza (STZ #) and resetting the line number within the stanza to its initial value. Lastly, if the amount of leading white space has changed, the WhiteLineCount (WHT.LNS) is reset back to zero. But if the line is non-blank and does not constitute a new stanza, it merely constitutes an additional line of the current stanza, so the StanzaLineNum (STZ.LN #) is incremented. Then, once the non-blank line has been otherwise processed, the current value of leading white space (LD.WHT) is stored for the next iteration of the loop, and the BlankLineFlag is cleared.

Each line of the Normal layout is processed as above, and an entry for the data of each line is entered into NormalData. Once all Normal layout lines have been processed, the NormalData is complete, except for the LVL values which depend on the targeted Special layout mode. Once a targeted Special mode has been selected, the LVL values in NormalData can be updated for each line according to the target Special layout. All Special layouts employ the leading white space (LD.WHT) information for each line, but only the Timeline layout employs the WhiteLineCount (WHT.LNS) information for each line.

FIG. 3B depicts a flowchart for creating a Normal layout data structure. The Normal layout data structure ("NormalData") is at the heart of the current invention and allows for reformatting of the Normal layout text lines into the desired Special layouts. In one embodiment of the invention, after some initialization, each line of the Normal layout is processed, and an entry is made into NormalData. Lines that include only white space are considered blank lines. Blank lines delineate stanzas. Lines that have viewable characters are considered to be non-blank. Stanzas consist of consecutive, non-blank lines that have the same level of indentation. Therefore, a stanza can be delineated in two different ways. The first way of delineation is by a blank line, which means that the previous non-blank line was the last line of the previous stanza, and the next non-blank line begins a new stanza. The second way of delineation is by change in indentation, which means that the previous non-blank line at the last indentation level is the last line of the previous stanza, and the current non-blank line at the new indentation level is the first line of a new stanza. Note that the second way is not visually appealing and should be accompanied by and preceded with a blank line which serves to make the delineation visually appealing.

Beyond the variable names defined in NormalData, the flowchart introduces some other variables. LineIndex is used as an index to iterate through each line of Normal layout text. PrevWhiteCnt is used to track the previous indentation value of LD.WHT to detect change. BlankLineFlag is used to detect a blank line coming during processing of a stanza.

Notably, the NormalData structure gets recreated every time the work transitions from Normal layout to one of the Special layouts. NormalData is created just before transition into a Special layout, and the NormalData is stored while the work is in a Special layout. The NormalData is used to return the work from a Special layout to the Normal layout, at which time the NormalData is discarded.

FIG. 4 depicts a sample literary work in Timeline mode. In particular, the sample literary work of FIG. 1 is depicted, both in Normal layout and Timeline layout. In Timeline mode, the author easily toggles between Normal layout and Timeline layout. The visual difference between the two layouts is that the second verse, Verse2, is to the right of the first verse, Verse1, in the Timeline layout, but Verse2 is below the Chorus in the Normal layout. In particular, each line of Verse2 is shown to the right of the corresponding line of Verse1. For example, the first line of Verse2 is shown to the right of the first line of Verse1. Similarly, the second, third, and fourth lines of Verse2 are shown to the right of the second, third, and fourth lines of Verse1, respectively. The lines of Verse2 in Timeline layout are aligned with one another. If there were a Verse3, accordingly it would be to the right of Verse2.

FIG. 5A depicts pseudocode for displaying a literary work in Timeline layout. In particular, pseudocode for one embodiment of the invention is shown. In this embodiment, the NormalData structure gets created by processing the Normal layout text with the target Special mode set to Timeline, and then the Normal layout text is removed so that the Timeline layout text can be placed. Additionally, because certain lines are going to be placed to the right of other lines, and the start of those placed lines should align vertically, the maximum line length of all stanzas must be determined so that the proper amount of white space padding can be added to the end of each line that is to be followed by another verse's peer line.

Once this preparation is complete, each line entry in NormalData is processed and the line text placed into the layout. The code checks each entry in NormalData to see which Level the entry is assigned, and a separate data structure is used to capture the stanza number of the first stanza at each level. This information is used to classify each stanza as either the "first" of its level or not the first of its level. If the stanza is the first of its level, the line is placed into the layout at its original line position but then is padded by the amount of white space required to ensure that righter-more added lines align properly. For lines in a stanza that is not the first of its level, those lines will be appended to the right of a previously placed and padded line. Using the Level of the line to be placed allows determination of the first stanza at that level from the FirstStanzaAtLevel structure. With that "first" stanza number and the current line's Stanza Line Number (STZ.LN #) info, the original line number (LN #) of the corresponding line in the first stanza can be determined, and then the current line, with padding, can be appended to the right of that layout line at line LN #.

Notably, the ability to add and remove new lines is disabled while in any Special mode, which preserves the integrity of the NormalData structure. Once the Normal layout is restored, the ability to add and remove new lines is enabled. Also, it is notable that white space padding is just one way to ensure that right-added lines align properly with their vertical siblings. Other means can be employed to enable such alignment, such as via tab markers or any other means available in the art.

FIG. 5B depicts pseudocode for displaying a literary work in Timeline layout. In particular, pseudocode for an alternate embodiment of the invention is shown.

FIG. 5C depicts a flowchart for displaying a literary work in Timeline layout. In particular, the flowchart depicts yet another embodiment of the invention. In this embodiment, the NormalData structure gets created by processing the Normal layout text, and then the Normal layout text is removed so that the Timeline layout text can be placed. Notably, the ability to add and remove new lines is disabled. Addition and removal of new lines is disabled while in any Special mode, which preserves the integrity of the NormalData structure. Once the Normal layout is restored, the ability to add and remove new lines is enabled.

Because peer stanzas are shown side-by-side, care must be taken to ensure that the visual text of appended lines properly aligns on the left. One way to ensure alignment is to pad with white space each line placed. Processing through all the RICH.TEXT lines for the longest length determines the maximum line length. A constant, defaulting to 8, is added to the maximum line length to determine the required line length. Then, as each RICH.TEXT line from NormalData is processed, three things happen: first, if the first rich text line is about to be placed on a blank line, leading white space (LD.WHT) for that rich text line is placed; second, the original rich text line is placed and "marked," or identified for later retrieval; and third, the line is padded with trailing white space according to the required line length. Every RICH.TEXT line from NormalData is so placed into the Timeline layout. Once in the Timeline layout, only "marked" text can be edited. The manner of "marking" text may vary by implementation. One way of "marking" text is by inserting special pairs of marks which flow with the text while editing and can be used to later extract the edited text. It is understood that other ways of marking text may be employed. Only marked text can be edited while in a Special mode. This preserves the integrity of the NormalData and the ability to use NormalData to return to Normal layout.

The NormalData structure can be indexed into by an original line number to determine corresponding LVL and STZ.LN #values. The LVL and STZ.LN #values can then be used to extract from NormalData an ordered list of matching original line numbers. This information can be used for both "First Set of Levels?" and "Determine Original Line #of $1^{st}$ Peer Line." If LineNumber is the first item in the ordered list, then "First Set of Levels?" is answered as an affirmative yes. If LineNumber is not the first item in the ordered list, then "Determine Original Line #of $1^{st}$ Peer Line" resolves to the line number which is the first item in the ordered list.

FIG. 6A depicts pseudocode for displaying a literary work in Normal layout. In particular, pseudocode for one embodiment of the invention is shown. The process in this embodiment is used to return a work in any Special layout to the Normal layout. It does this by first verifying the integrity of the NormalData structure. Then each entry of NormalData is mapped to the corresponding text in the Special layout, and if that Special layout text differs from what is stored in NormalData, the NormalData entry is updated with the different text and that text is removed from the Special layout. Once all the NormalData entries have been processed, the Special layout is checked for any outstanding non-white text. If any non-white text is found, an error is flagged. Then all remaining white text, including blank lines, is removed. Lastly, the NormalData structure, having been updated with any changed text from the Special layout, is parsed one entry at a time, and the corresponding entry rich text lines, preceded by any entry leading white space, are placed into the Normal layout.

FIG. 6B depicts a flowchart for displaying a literary work in Normal layout. In particular, a flowchart for an alternate embodiment of the invention is depicted. The depicted process is used to return a work in any Special layout to the Normal layout. It does this by first grabbing each marked text line of the Special layout and storing it in an internal "SpecialData" structure, associating it with the corresponding Original Line #of the marked text. Once all the marked text lines have been retrieved, any remaining text is wiped. Then, the NormalData structure is processed to restore all the lines of the Normal layout before the Special layout was entered. For each NormalData original line, any corresponding white space (LD.WHT) is placed, and then the corresponding rich text is located and placed. The rich text for the line is first looked for in SpecialData. If the rich text is not found in SpecialData, it will be extracted from NormalData.

Once Normal layout is restored, the ability to create new lines and delete existing lines is enabled. The NormalData and SpecialData structures are no longer required and can be discarded.

FIG. 7 depicts a sample literary work in Overlay mode. In particular, the sample literary work of FIG. 1 is depicted, both in Normal layout and Overlay layout. In Overlay mode, the author can toggle between the two layouts. The visual difference between the two layouts is that each of the Verse2 lines in the Normal layout has been transposed to be immediately under the corresponding, peer line in Verse1 and followed by a blank line in the Overlay layout. This visually gives the impression that the pairs of lines of the verses are "grouped." Here, the first line of Verse1 is grouped with the first line of Verse2, and so each line of Verse1 is grouped with its peer from Verse2. Each pair of grouped verse lines is followed by a blank line to make the grouping clear. Each line of Chorus, although without a peer line, also has a blank line inserted after it.

FIG. 8 depicts a sample literary work in Fold mode. In particular, the sample literary work of FIG. 1 is depicted, both in Normal layout and Fold layout. In Fold mode, the author can toggle between the two layouts. In both layouts, the last word of each line has been colorized for demonstration purposes to visually indicate the existing rhyme scheme. The main visual difference between the two layouts is that the line ordering of each stanza in the Normal layout differs from the line ordering in the corresponding stanza in the Fold layout. In particular, each stanza in the Fold layout has the lines reordered such that each pair of lines that end with rhyming words are now vertically adjacent. This is obvious given the demonstrative visual indication.

The Fold layout differs from the other two Special layouts in that it requires supplemental, non-white space information. The Timeline and Overlay layout modes analyze white space to group peer lines across stanzas and then juxtapose those lines to be either vertically or horizontally adjacent. However, the Fold layout transposes lines within each stanza and thus requires additional information beyond what can be ascertained by white space analysis. The Fold layout requires extra information on how to transpose those stanza lines, called the "Fold Patterns" information. The Fold Patterns is a data structure which includes for each logically grouped set of stanzas a "Fold Pattern," or "folding" information on how the lines of each stanza should be transposed. The Fold Patterns therefore includes folding information for each stanza of the literary work. The literary work is processed in the Normal layout to create a NormalData structure, and each rich text line has a LVL value. Stanzas are logically grouped by LVL values, so the Fold Patterns must include folding information for each unique LVL value.

The Fold Patterns can be manually defined by the author. Alternatively, the invention can attempt to automatically detect some recognizable pattern in each stanza from which to generate folding information. An obvious choice is end rhyme, as demonstrated in the sample work. However, other possibilities for pattern detection exist and include the following: common visual indication, such as font, style, or colorization; internal rhyme or other types of rhyme; common rhythmic patterns; syllable count or stressed syllable count; alliteration; and so on. It is understood that the preceding list is exemplary but not exhaustive. It should also be noted that the added demonstrative visual indication of the last word of each line to accentuate the rhyme pattern could also be used by the invention to detect folding information by visual indication, which would give the same result as the end rhyme detection.

Because folding information is by LVL, the first stanza at each LVL can be parsed to detect folding information, and then that folding information will be applied to every stanza at the same level LVL. This enforces consistency for all logically-grouped stanzas which share the same LVL value.

In the sample work, lines 1 and 3 of the first stanza rhyme, and lines 2 and 4 also rhyme. In particular, the rhymes are perfect rhymes, easily detectable. This rhyme scheme is notated ABAB. By transposing lines 2 and 3, the line ordering 1324 would be in AABB rhyme scheme, desirable because rhyming lines would be adjacent. Because the last line in a stanza is generally the line most likely to rhyme with another line, preferential treatment over other lines may be optionally given. So, the 1324 order can be reordered to 2413 to give the last line (4) and its rhyming line preference over other lines. In the instant example, the reordering is done. This is the folding information for Verse1, and because Verse1 and Verse2 are peers of the same LVL, the same folding information is applied to both Verse1 and Verse2. A quick look at the Fold layout shows this to be correct when comparing the "Ln #" line numbers between the Normal and Fold layouts. Also notable is that applying the folding information from Verse1 to Verse2 gives the expected result, serving to confirm that the rhyme scheme of the two verses is consistent.

Similarly, for the Chorus, the rhyme pattern is detectable as ABBA. Moving line 4 in between lines 1 and 2 yields a line ordering of 1423 with a rhyme scheme of AABB. The last line 4 is already in the first group of rhyming lines, so no additional reordering needs to be considered. Again examining the Fold layout shows the expected result.

FIG. 9A depicts pseudocode for displaying a literary work in Overlay layout. In particular, pseudocode for one embodiment of the invention is shown. The embodied process begins with digesting the Normal layout text to create the NormalData structure. Once NormalData is created, the text is wiped in preparation for placing text in the Overlay layout. The number of discrete Level (LVL) values in NormalData is determined, and those values are then iterated through. For each Level value, the first stanza at that level value is determined, and then the lines of that first stanza at that level value are iterated through. For each first stanza line index, NormalData is searched in sequential line order for matches to Level and the stanza line index. For each match, the matching line text is placed into the layout, preceded by the line's leading white space (LD.WHT). After each set of matches, a blank line is inserted to visually separate the matching lines.

FIG. 9B depicts a flowchart for displaying a literary work in Overlay layout. In particular, a flowchart for another embodiment of the invention is shown. The embodied process begins with creating the NormalData structure, as with other Special layouts. Once NormalData is created, the rest of the text is wiped in preparation for placing text in the Overlay layout. The depicted algorithm starts by determining the number of discrete LVL values in NormalData, and looping on those LVL values. For each LVL value, the number of lines in the first LVL stanza is determined, and then lines matching LVL and the current stanza line number are extracted from NormalData and placed into the display window vertically, followed by a blank line. As each line of text is placed, it is indented by the appropriate amount of white space (from LD.WHT) and the line of text is marked as above for post-edit extraction.

FIG. 10A depicts pseudocode for displaying a literary work in Fold layout. In particular, pseudocode for one embodiment of the invention is shown. The embodied process parses the Normal layout text to create NormalData and then wipes the Normal text. Then each entry in NormalData is processed in order, placing each entry's line of text at the proper position in the Fold layout. In order to do this, the Fold layout requires extra information, called Fold Patterns data, which determines how the lines in each stanza will be transposed/reordered internally to the stanza. Fold Patterns data can be entered manually by the author or automatically detected by the invention. The Fold Patterns data is used to map the lines of a stanza in Normal layout to a possibly-different position within the stanza in the Fold layout. Blank lines are placed at the same line position in the Fold layout as they were located in the Normal layout. Non-blank lines are mapped to a Fold layout position, which may be different than the Normal layout position, and are placed with their leading white space (LD.WHT). To map, the line number position of the Normal layout line is decreased by the stanza line number (STZ.LN #) of the current entry, increased by one, and increased by the index of STZ.LN #in the Fold Patterns data for the stanza.

Examining the first stanza of the literary work in FIG. 8 will clarify. The first stanza, Verse1, has a rhyme scheme of ABAB for lines 1, 2, 3, and 4 (or "1234"). An easy way to group the rhyming lines is to swap lines 2 and 3 to give line order "1324", which then has rhyme scheme AABB, which is desirable due to the grouping of the rhyming lines. However, one embodiment of the invention favors the last line in a stanza, since the last line is the line in a stanza most likely to rhyme with another line in the stanza. For this reason, the line order is changed to favor the last line, in this case line 4, by swapping the pairs of lines, giving the line order "2413." Thus, "2413" is the Fold Pattern for the first stanza. Treating "2413" as an indexable item, "2" is at index 0, "4" is at index 1, "1" is at index 2, and "3" is at index 3.

Mapping the first stanza of the Normal layout of FIG. 8 via the instant pseudocode using the above Fold Pattern information yields the first stanza of the Fold layout in FIG. 8. Normal layout lines one through four will be examined. The first line of the work is also line 1 in the stanza. Normal line 1 maps to the Fold position at 1 (LN #)–1 (STZ.LN

)+1+(index of "1") 2, or position 3. Normal line 2 maps to 2 (LN #)−2 (STZ.LN #)+1+0 (index of "2")=position 1. Normal line 3 maps to 3 (LN #)−3 (STZ.LN #)+1+3 (index of "3")=position 4. And Normal line 4 maps to 4 (LN #)−4 (LN #)+1+1 (index of "4")=position 2. In summary, lines 1, 2, 3, and 4 in the Normal layout map to lines 2, 4, 1, and 3 in the Fold layout, as expected.

FIG. 10B depicts a flowchart and pseudocode for displaying a literary work in Fold layout. The Fold layout requires Fold Patterns data, which determines how the lines in each stanza will be transposed. Fold Patterns data can be entered manually by the author or automatically detected by the invention.

In one embodiment of the invention, the process begins with creating the NormalData structure, as with other Special layouts. Once NormalData is created, the rest of the text is wiped in preparation for placing text in the Fold layout. The depicted algorithm loops on the entries of NormalData, extracting the rich text, LN #, STZ.LN #, LD.WHT, and LVL. The LVL value is used to extract folding information from Fold Patterns for the stanza. The values LN # and STZ.LN # are used with the folding information to map the original LN # to the Special layout line number. Then the appropriate amount of white space (from LD.WHT) and the marked rich text are placed at the Special layout line number.

FIG. 11 depicts pseudocode for automatically determining Fold Patterns. If NormalData does not exist, it is created. The Fold Patterns requires a fold pattern for each LVL level value, so each LVL value is examined independently. In one embodiment of the invention, the fold pattern of each LVL is automatically determined by examining the visual indication of the last word of each line. A baseline is set using the default visual formatting of the overall work, such as font family, size, type facing, colorization, and any borders, and then deviations from that baseline are looked for in the last word of each line in the level. To qualify as information sufficient to generate folding information for the level, at least two of the lines (determined by the last word in each line), but fewer than all the lines, must have identical visual indication that differs from the baseline. If all the lines have identical visual indication, no change in the default folding information for each line is merited.

To allow the Fold mode to operate when no Fold Patterns has been entered by the author and no auto-determination of the Fold Patterns is possible, default values are set for Fold Patterns. For each level, the default folding information is the list of lines in their original order, so an N-line stanza would have a default order of "12 . . . N". For example, a four-line stanza would have the default Fold Pattern or folding information of "1234". As a result of this default folding information, the line ordering in the Fold layout for that level remains unchanged.

The above describes how to automatically detect Fold Patterns information from the literary work based on changes in visual indication. Other bases of detection are possible, such as by end rhyme, number of line syllables, number of stressed syllables in the line, rhythmic patterns, and others. Some of the other bases, such as by end rhyme, can be combined with the automatic determination of Fold Patterns by visual indication. For example, an automatic detection of end rhyme can cause visual indication of the rhyming ends words. These visually indicated rhyming end words can then be detected by the method of automatically determining the Fold Patterns in FIG. 10B. Lastly, it is understood that not all visual indications may be useful for automatically determining Fold Patterns, and some may need to be excluded due to other processing concerns, which will be discussed later.

FIG. 12 depicts a chart of canonicalization samples. In particular, the chart shows the syllables and phonetics libraries entries and generated canonical forms for a sampling of the words from the first two lines of the Chorus stanza in FIG. 1. In one embodiment of the invention, the syllables and phonetics libraries are separate but can be used together to automatically determine how to divide a word into syllables and which of those syllables are stressed. In an alternate embodiment of the invention, the two libraries are combined into a single library. This library information will be utilized to further the ability to visually compare various lines of a literary work.

The chart consists of six columns. The first column, "WORD", contains a set of words to be processed. The next two columns include syllable information. The second column, "SYLLABLES LIBRARY", contains the syllables library entry of each word. The syllables of each entry are separated by hyphens. The third column, "SYL CNT" (Syllable Count), contains the number of syllables, determined from the entry in the second column.

The fourth column, "PHONETICS LIBRARY", contains the phonetics library entry or entries of each word, with multiple entries separated by vertical bar. The instant chart shows entries from the Carnegie Mellon University Pronouncing Dictionary ("CMUdict"), but other phonetics libraries can be used.

In CMUdict, phonetics are shown separately for each vowel and consonant sound, or "phone," and each vowel sound is followed by a digit which indicates the relative stress of the vowel sound. Vowel sounds receiving primary stress are followed with "1." Vowel sounds receiving secondary stress are followed with "2." Unstressed vowel sounds are followed with "0." Words with multiple pronunciations will have multiple phonetic representations. Multiple pronunciations may vary by either sound, stress, or both.

The fifth column, "PHON EMPH/CNT" (Phonetic Emphasis/Count), contains the position number of the primary stressed syllable in the word, followed by the position numbers of secondary stressed syllables, if any. If there is no primary stressed syllable, or one is not determinable, a "0" is present. After a forward slash separator character, the total number of syllables in the word is shown. Stressed syllable numbers start at 1. Each vowel in the phonetics represents a syllable, allowing determination of the primary and secondary stressed syllables, if any, and the syllable count. When there are multiple pronunciations, only factors common to all pronunciations can be detected automatically, through a "merging" process. For example, if a two-syllable word has two pronunciations, only one syllable is stressed, and the stressed syllable differs between the two pronunciations, the stressed syllable will not be automatically determinable, and the column will contain "0/2". The "0" implies that either there is no stressed syllable or one was not determinable, and the "2" represents the syllable count, as before. An example of such a word is the word "present," which can be emphasized on the first syllable (to mean "a gift") or on the second syllable (to mean "the act of giving").

The sixth column, "WORD WITH STRESSED SYLLABLES", shows two different forms of each word divided into syllables: a first "canonical" form in plain text with stress values appended to each syllable, and a second "visualized" form in rich text with stressed syllables visually indicated in bold typeface with underlining for primary stressed syllables, and underlining for secondary stressed syllables. The syllables library teaches how to divide the word into separate syllables. The phonetics library teaches which syllables, if any, are stressed. If there is agreement between the two libraries regarding the number of syllables in the word, the information from the two libraries can be combined to allow automatic determination of the stressed syllable characters, as shown in the plain text of the canonical form. Visual indication in the form of bold typeface can be seen in the visualized form. Further, the process is not case sensitive.

For example, the first sample word in the chart in the first column is "Chorus." Examining "chorus" in the syllables library yields two syllables: "cho" and "rus" with "Cho-rus" in the second column and "2" in the third column. The word "Chorus" is represented in CMUdict as "K AO1 R AH0 S", which is seen in the fourth column and has two vowel sounds and therefore two syllables. The first vowel sound is stressed, represented by the "1" after "AO". The second vowel sound is unstressed, represented by the "0" after "AH." Therefore the word has two syllables, and the first of the two syllables is stressed. Accordingly, the fifth column contains "1/2". Both libraries agree that the word "chorus" has two syllables. The phonetics library says the first syllable is stressed, and the syllables library says the first syllable consists of the first three characters, "cho", so the sixth column contains "Cho1-rus0" as the canonical form and "Cho-rus with the first three letters in boldface type as the visualized form.

The second sample word in the chart is "enjoy." The syllables library yields two syllables: "en" and "joy" with "en-joy" in the second column and "2" in the third column. The word "enjoy" is represented in CMUdict as "EH2 N JH OY1", which is in the fourth column and has two vowel sounds and therefore two syllables. Here the second of the two syllables has the primary stress and the first syllable has secondary stress, represented by "21". Since the phonetics library shows two vowels and thus two syllables, the fifth column contains "21/2". Both libraries agree that the word has two syllables. The phonetics library says that both syllables are stressed, and the syllables library says that the second syllable consists of the last three characters "joy", so the sixth column contains "en2-joy1" as the canonical form and "en-joy" with the first two and last three letters in boldface type as the visualized form.

The third sample word in the chart is "the." The syllables library states that the word has a single syllable, and so the word appears without hyphens in the second column and a "1" appears in the third column. The word "the" has three entries in CMUdict, and so all three appear as "DH AH0|DH AH1|DH IY0" in the fourth column. All three entries agree that there is only one vowel and thus one syllable in each pronunciation. However, the three entries disagree as to which vowel sound is present and whether the vowel is stressed. The stressed syllable cannot be determined and defaults to "0". (This default determination will be discussed in a later section on "Merging Stress from Multiple Phonetics Library Entries.") The fifth column therefore shows "0/1", not identifying the stressed syllable but confirming a total syllable count of 1. The sixth column shows "the0" as the canonical form and "the" as the visualized form without any visual indication of stressed syllables.

The fourth sample word in the chart is "band." The syllables library yields one syllable: "band" with "band" in the second column and a "1" in the third column. The word "band" is represented in CMUdict as "B AE1 N D", which is in the fourth column and has one vowel sound and therefore one syllable. Here the one syllable is stressed, and so the fifth column contains "1/1". Both libraries agree that the word has one syllable. The phonetics library says that the one syllable is stressed, and the syllables library says that the one syllable consists of all the characters in the word, so the sixth column contains "band1" as the canonical form and "band" with the whole word in boldface type as the visualized form.

The fifth sample word in the chart in the first column is "musicians." Examining "musicians" in the syllables library yields three syllables: "mu", "si", and "cians" with "mu-si-cians" in the second column and "3" in the third column. The word "musicians" is represented in CMUdict as "M Y UW0 Z IH1 SH AH0 N Z", which is seen in the fourth column and has three vowel sounds and therefore three syllables. The second vowel sound is primarily stressed, represented by the "2" after "IH". The first and third vowel sounds are unstressed, represented by the "0" after "UW" and "AH". Therefore the word has three syllables, and the second of the three syllables is stressed. Accordingly, the fifth column contains "2/3". Both libraries agree that the word "musicians" has three syllables. The phonetics library says the second syllable is stressed, and the syllables library says the second syllable consists of the third and fourth characters, "si", so the sixth column contains "mu0-si1-cians0" as the canonical form and "mu-si-cians" with the third and fourth letters in boldface type as the visualized form.

The sixth sample word in the chart processes unremarkably, similarly to the first sample word.

If there is no agreement between the two libraries regarding syllable count, or the word is not found in either library, then indication of stressed syllables does not take place. If the word is found in the syllables library but not in the phonetics library, the word can still be divided into syllables, as shown in the second column, but without demonstrating emphasis as in the sixth (last) column.

The above processing is automated and can make the above determinations automatically. However, it is understood that the above may not always yield the desired output. In one embodiment of the invention, the above mechanism can be overridden on a word-by-word basis when necessary. Possible ways to override include the use of an author-created dictionary common to the text editor program, an author-created dictionary associated with a particular literary work, or author-created tagging associated with a particular word in a literary work. It is understood that this list of ways to override is not exhaustive and that other means of overriding the automated determination process above may exist.

Additionally, it is understood that the canonical form presented is just one possible representative form and that other representative forms are possible. For example, the word "Chorus" is represented in the current canonical form as "Cho1-rus0", a single string with syllables separated by a hyphen and a stress digit appended to each syllable. Other possible representations may include employing a list structure. One such example is ["Cho1", "rus0"], where the syllables are no longer separated by a hyphen but exist as separate ordered list entries, where each syllable still has a final digit declaring stress. Other possible representations may separate the stress information from the word syllables. One such example representation is ["Cho", "rus", "10"], where the syllables appear as separate ordered list entries but without the appended stress digit, and the stress information appears as a separate stress string, with each syllable represented by the corresponding character in the stress string.

It is understood that other canonical form representations are possible, and that the above list of examples is not exhaustive.

FIG. 13 depicts pseudocode for merging stress from multiple phonetics library entries. Although some words have only one phonetics library entry, other words have multiple phonetics library entries. When there are multiple entries, the invention compares the multiple entries looking for commonalities which can be extracted to create a single "merged" entry. It does so by merging the vowel stresses of all the entries separately by vowel position. It will determine a merged stress value for the first vowel of each entry. If there are more than one syllable per word, it will determine a merged stress value for the second vowel of each entry, as well, and so on until all vowel positions have been processed.

The algorithm examines the set of stress values on a positional basis. If all the stress values at a particular position are "1", indicating primary stress, then the merged positional value is "1". If at least one of the stress values at a particular position is "0", indicating no stress, then the merged positional value will be "0". Lastly, when the stress values include both "1" and "2", indicating a combination of primary and secondary stress, the merged result is "2" for secondary stress at that position. This logic is demonstrated in the previous figure while determining the canonical form of the word "the," which has three different phonetics library entries, two of which state emphasis as "0" and one of which states emphasis as "1". Because there is no agreement, the merged stress defaults to "0".

This approach is a conservative approach for determining the minimal reasonable stress when multiple pronunciations of a word are available. This effort is made to allow the author of a literary work the best result when activating the automated system to automatically detect stressed syllables and give visual indication of them. However if the author does not receive the results that he expects, he can override the system to get the desired results.

FIG. 14 depicts pseudocode for determining phonetic emphasis. In particular, the pseudocode determines phonetic emphasis for display in the fifth, "PHON EMPH" column of the FIG. 12 chart for canonicalization from syllables and phonetics libraries. The algorithm starts with a clear string, and for each positional vowel in the phonetics entry of the word, it prepends the position number for a primary stress "1" vowel and appends the position number for a secondary stress "2" vowel. If no stresses are found among all vowel sounds, the empty string is set to "0" before being returned.

FIG. 15 depicts a merged stress example. In particular, the example demonstrates the application of the algorithm in the previous figure to the word "adverse". The example is presented in chart form. The chart contains five columns. The first column contains line numbers. The second column contains delineations of the word "adverse". The third column, "PHONETICS ENTRY," contains phonetics entries for the word. The fourth column highlights the "First Vowel Stress" of the phonetics. The fifth column highlights the "Second Vowel Stress" of the phonetics.

In CMUdict, the word "adverse" has three phonetic entries, seen in the chart in the WORD ENTRIES and PHONETICS ENTRY columns on lines 1 through 3. Those three phonetic entries have their first vowel stress expanded into the fourth column and their second vowel stress expanded into the fifth column. On line 4 of the chart, the merging process begins. In lines 1 through 3 of the First Vowel Stress column, line 1 has stress "0", line 2 has stress "1", and line 3 has stress "2". Merging the three vowel stresses yields a "0" because at least one of the values is a "0". As a result, the merged stress value for the first vowel, and thus syllable, is "0", shown on lines 4 and 5 in the same column.

Similarly, in lines 1 through 3 of the Second Vowel Stress column, line 1 has stress "1", line 2 has stress "2", and line 3 has stress "1". Merging the three vowel stresses yields a "2" because the values are not all "1" and there are no "0" values. As a result, the merged stress value for the second vowel, and thus syllable, is "2", shown on lines 4 and 5 in the same column.

Having merged the vowel stresses for the two vowel positions, a merged phonetics entry can be determined using the merged vowel stresses. This yields a merged phonetics entry of "AE0 D V ER2 S" for the word "adverse" when the invention must determine it automatically. According to this, by default, the first syllable of "adverse" is unstressed and the second syllable is secondarily stressed.

FIG. 16 depicts pseudocode for canonicalizing a word with syllables stress. In particular, the pseudocode represents the method of visually indicating stressed syllables as employed in FIG. 12. The algorithm uses both the syllables library and the phonetics library. First the word's entry in the syllables library is extracted. If found, the number of syllables in the word are counted. The word is looked for in the phonetics library, and all entries are extracted. If there is a single entry, the single entry is used as is. If there are multiple entries and all the entries agree on the number of syllables, the multiple entries are merged into a single entry as per FIG. 13. The phonetics entry is then used to determine primary or secondary stressed syllables, if any. Once determined, the word under analysis can be visually indicated with stressed syllables. Syllables are separated with hyphens. Stressed syllables can either be visually indicated via type facing, such as font family, size, type facing, bolding, underlining, or via colorization. Alternatively, the word can be modified by inserting the stress values of the phonetics into the syllabized word after each respective syllable, allowing for later determination of visual indication.

FIG. 17 depicts sample text in Canonical mode. In particular, sample text is shown in both plain form and "Canonical" form. In Canonical mode, the author can toggle between the two forms.

Canonical form is as taught in FIG. 12. To "Canonicalize" is to transform from plain form to Canonical form using the information from syllables and phonetics libraries. To "De-Canonicalize" is to transform from Canonical form to plain form.

FIG. 18 depicts sample text in Syllables mode. In particular, the sample text is depicted both in plain (whole word) form and in "Syllabized" form, with each word separated into syllables joined by hyphens. In Syllables mode, the author can toggle between the two forms. White space between words is preserved.

The Syllabized form shows visual indication of syllables by separating each syllable of a word with a hyphen. Plain form is without such visual indication. When Syllabizing, the Syllables library is employed to look up the appropriate entry for each word. In one embodiment of the invention, when Syllabizing, each plain word version is replaced with the Syllabized version. When De-Syllabizing, the Syllabized version is replaced with the plain version. In another embodiment of the invention, the word remains in place, and hyphens are inserted as needed to Syllabize the words. When De-Syllabizing, the hyphens are removed.

In one embodiment of the invention, the Syllabized version of a word is extracted directly from the syllables library. In an alternate embodiment of the invention, the Syllabized version of the word comes from an interim Canonical form where the final stress digits are then removed.

FIG. 19 depicts sample text in Emphasis mode. In particular, the sample text is depicted both in plain form and in "Emphasized" form, with each stressed syllable of a word visually indicated in bold type face, along with underlining for visibility in the instant document. In Emphasis mode, the author can toggle between the two forms. White space between words is preserved.

The Emphasized form shows visual indication of stressed syllables. Plain form is without such visual indication. The sample text shows visual indication as bold type facing of the text, but other visual indications are possible, such as changing of font family, size, alternate type face, or colorization. Emphasized form is achievable by an interim conversion to Canonical form, and then using the Canonical form to generate visually indicated rich text. In one embodiment of the invention, syllables ending in "1" or "2" will receive visual indication. The visual indication of primary stressed syllables, ending in "1", may differ from the secondary stressed syllables, ending in "2". In another embodiment of the invention, only primary stressed syllables, those which end in "1", receive visual indication.

FIG. 20 depicts sample text in Columns mode. In particular, the sample text is depicted in both plain form and in "Columnized" form, in which both words and hyphenated words are separated into columns by white space. In Columns mode, the author can toggle between the two forms. Leading white space for each line is preserved. In one embodiment of the invention, white space between words and hyphenated words is preserved when toggling between forms. In an alternate embodiment of the invention, white space between words and hyphenated words is not preserved when toggling between forms.

To Columnize text, words are separated by a predetermined amount of white space. For the purposes of Columnizing, both words and hyphenated words are treated as items to Columnize. In one embodiment of the invention, Columnizing occurs by the insertion of white spaces after each word or hyphenated word as appropriate, and De-Columnizing occurs by deleting the inserted white spaces. In another embodiment of the invention, Columnizing is achieved by inserting tab characters after each word or hyphenated word as appropriate and setting tab stop positions to create the desired layout of columns. De-Columnizing is achieved by deleting the inserted tab characters, optionally unsetting tab stop positions.

For the purpose of Columnizing, hyphenated words and Syllabized syllables are treated as separate words to Columnize. Each hyphen character serves as a splitting point.

FIG. 21 depicts sample text in Beats mode. In particular, the sample text is depicted in both plain form and in "Beats" form. In Beats form, all words are split into syllables, visual indication of stressed syllables is added, and all syllables are Columnized. In Beats mode, the author can toggle between the two forms. To "Beatify" is to transform from plain text to Beats form. To "De-Beatify" is to transform from Beats form to plain form. To aid in visibility, emphasized beats are underlined, and primary emphasis beats are also bolded.

In one embodiment of the invention, Beats form is achieved by an interim Canonicalization of the plain text, from which the Beats form is generated. Leading white space is preserved for each line. From the Canonical form, each syllable is placed given the proper visual indication for emphasis, and then the text is Columnized. To achieve plain form, the text is De-Columnized, all syllable-separating hyphens are removed, and all visual indication of emphasized syllables is removed.

In another embodiment of the invention, Beats form is achieved by Emphasizing the text, then Syllabizing the text, and then Columnizing the text. Plain form is achieved by reversing the process: De-Columnizing the text, then De-Syllabizing the text, and then De-Emphasizing the text.

In Beats form, the rhythmic pattern of the three lines of sample text is easily compared. Some visual differences are seen. First, the second and fourth syllables of Ln1 and Ln2 have primary emphasis while the first and third syllables in Ln3 have primary emphasis. Second, Ln1 is the only line that starts with a syllable with secondary stress. Third, Ln2 has one extra syllable at the end of the line as compared to Ln1 and Ln3.

The first difference is the most apparent and important. If the author intends that the rhythm of all three lines is comparable and compatible, the difference in location of the primary emphasized beats may be an issue. The second difference, Ln2 starting with a secondary stress syllable, may not be a concern, because the primary stressed syllables are of primary importance. And the third difference, Ln2 having an extra unstressed syllable at the end, is probably of minimal importance. So, overall, although there are differences between the rhythmic patterns of the three lines, the differences may be acceptable to the author. But with this display of the rhythmic differences, the author can make an informed choice as to how to proceed.

FIG. 22A depicts sample text showing Beats padding. In particular, the sample text shows two boxed versions of the same Beats form text, with the second containing a padded Beat, inserted at the beginning of Ln3.

Because Beats form is used to compare stressed and unstressed syllables of multiple lines, there are times when a "placeholder" Beat needs to be inserted to represent a pause in the text and allow Beats to be properly compared. In order to achieve this, the Beats form supports padding. Insertion of placeholder Beats is performed manually by the author. In one embodiment of the invention, inserted placeholder Beats are preserved when toggling through Beats mode between Beats form and plain form.

Comparing the three lines in the first box, the second line has one extra syllable or Beat. When comparing the stress of the Beats, the first and second lines have primary stress on the second and fourth Beats, while the third line has primary stress on the first and third Beats. Accordingly, the third line can be made to be rhythmically compatible by inserting an unstressed placeholder Beat as the new first Beat of the third line, which is shown in the second box. Accordingly, the second box shows the Beats of the first box but with the placeholder Beat inserted as the first beat on the third line. Visual inspection after insertion of the placeholder Beat shows that the rhythm of the three lines in the second box is identical as far as primary stressed Beats.

FIG. 22B depicts the same sample text from the previous figure, but here showing additional Beats padding. In particular, the sample text shows two boxed versions of the same Beats form text, with the second containing multiple padded Beats. Beats mode not only allows the author to insert padded Beats to see if the emphasized Beats can be "aligned," but it also allows inserting padded Beats to visually represent the actual rhythm of the lines. In the instant case, the lines are envisioned to have been written in 6/8 musical timing, which means that each line would have six musical beats. But because the instant invention supports the manual insertion of Beat placeholders, Beat placeholders can be inserted so that the Beats correspond to the musical beats. Therefore, the author can truly see the visualization of the rhythm of his work.

FIG. 23A depicts a sample literary work in Fold/Beats mode. In particular, the sample literary work of FIG. 1 is depicted, both in Normal layout with text in plain form and in Fold layout with text in Beats form. The author can toggle between Normal layout and Fold layout, and the author can toggle between plain text form and Beats form. In this example, the Fold Patterns are based on end rhyme, and the Fold Pattern for the verses is 2413, and the Fold Pattern for the chorus is 1423.

Analyzing the Fold layout with Beats reveals some variations in rhythm. Looking at the first couplet of the Folded first verse, the number of Beats per line is the same and the stressed Beats line up as expected, with both lines having stressed second, third, and fourth Beats. Therefore the rhythm seems identical between the two lines. Looking at the second couplet of the Folded first verse, however, yields a different result. Although the first line of the couplet has stressed second, third, and fourth Beats, the second line of the couplet has stressed first, third, and fourth Beats, which may represent an undesired change in rhythm.

Looking at the first couplet of the Folded chorus, both lines have four Beats, with the last being stressed. However, the first line has primary stress on the second Beat and secondary stress on the first Beat, while the second line has primary stress on the first Beat. Looking at the second couplet of the chorus, the first line has an extra unstressed Beat at the end of the line. Interestingly, if an unstressed Beat were to be inserted as the first Beat of the second line, then the two lines would be rhythmically identical, as seen in previous figures. This can be achieved via manual Beat padding, as discussed earlier.

Looking at the first couplet of the second verse, each line has four Beats with primary stress on the first and fourth Beats, although the second line also has primary emphasis on the third Beat. This may be sufficiently rhythmically similar for the author. Looking at the second couplet of the second verse, each line has four Beats, with the first, third, and fifth Beats stressed. However, the second line also has the second Beat as stressed, which differs from the first line. The rhythm is not identical, but it may be sufficiently similar to satisfy the author.

Looking at the lines overall, we see that all but one of the lines of Verse1 have primary emphasis on the second Beat, while all but one of the lines of Verse2 have primary emphasis on the first Beat. Further, every line of the Chorus differs.

FIG. 23B depicts a sample literary work in Fold/Beats mode. In particular, it depicts the sample literary work from the previous figure, but now the author has padded the work with placeholder Beats inserted to show the work in 6/8 musical timing. With the insertion of the placeholder Beats, it becomes apparent that every Beat in the second and fifth columns is of primary stress. This uniformity is desired. Further, there is one Beat of secondary stress in the first column, but since it is immediately followed by a primary stress Beat, the secondary stress Beat may not be of concern to the author. Similarly, the primary stress Beats in the third and fourth column may not be of concern to the author. And lastly, the unstressed Beats in the last column may not be of concern to the author.

Further, as described above, the author has the ability to override the canonical form of any word in the work, either by modifying an application-wide dictionary, a work-specific dictionary, or by tagging a particular word in the work. By default, the words "is," "are," "on," and "than" are of primary stress. The author can override those defaults values, in multiple ways, to make them unstressed, if so desired.

FIG. 24A depicts a sample literary work in Overlay/Beats mode. In particular, the sample literary work of FIG. 1 is depicted, both in Normal layout with text in plain form and in Overlay layout with text in Beats form. The author can toggle between Normal layout and Overlay layout, and the author can toggle between plain text form and Beats form.

Analyzing the Overlay layout with Beats exposes some variations in rhythm. The first pair of lines has a first line with stress in the second, third, and fourth beats while the second line has stress in the first, third, and fourth Beats. Both lines have four Beats, but the rhythm is different.

Similar to the first pair of lines, the second pair of lines has a first line with stress in the second, third, and fourth beats while the second line has stress in the first, third, and fourth Beats. Both lines have four Beats, but the rhythm is different.

The third pair of lines has four Beats but different stressed Beats. The fourth pair of lines has four Beats but different stressed Beats.

Although the chorus lines are displayed, each is displayed individually, with nothing with which to compare. The chorus lines displayed are not informative.

FIG. 24B depicts a sample literary work in Overlay/Beats mode. In particular, it depicts the sample literary work from the previous figure, but now the author has padded the work with placeholder Beats inserted to show the work in 6/8 musical timing. With the insertion of the placeholder Beats, it becomes apparent that every Beat in the second and fifth columns is of primary stress. This uniformity is desired. Further, there is one Beat of secondary stress in the first column, but since it is immediately followed by a primary stress Beat, the secondary stress Beat may not be of concern to the author. Similarly, the primary stress Beats in the third and fourth column may not be of concern to the author. And lastly, the unstressed Beats in the last column may not be of concern to the author.

FIG. 25 depicts a flowchart for displaying a literary work in a Special layout. In particular, the literary work can be displayed in any one of the three Special layouts: Fold, Overlay, or Timeline. To show the Special layout, the editor is put into the corresponding Special mode, in which the author can toggle between the Special layout and the Normal layout.

FIG. 26 depicts a master flowchart for editing a literary work. In particular, once a literary work document is opened, the literary work can be displayed in Normal layout or in any of the Special layouts. At any time the form of the text of the literary work can be changed, via Emphasis, Syllables, Columns, or Beats mode. The text of the literary work can always be edited, regardless of layout or text form. At any time, the layout of the literary work can be changed. Once editing is complete, the literary work document can be closed, optionally saving the document.

FIG. 27 depicts an example of templated text. In particular, templated text generated by a user-assisting wizard is shown. The example templated text has a header and a body of text, separated by a separator line. The header has two lines, with the song title on the first line and a copyright notice on the second line. The literary work's text consists of a first verse, a chorus, a second verse, a repeated chorus, a bridge, and another repeated chorus. The header lines, the separator line, and the two verses are flush left.

The work's body begins with four lines of a first verse, "Verse1." Each line of the four lines begins with "This is Verse1" which is followed by a line designation number (Ln1, Ln2, Ln3, and Ln4, respectively) and a random word. The random word at the end of each line allows the wizard to generate lines that follow a certain rhyme scheme. The default rhyme scheme for each stanza is that the middle and last lines rhyme. In this four-line verse, the second and fourth lines rhyme, supported by the rhyming words "cry" at the end of the second line and "fly" at the end of the fourth line.

Following the first verse, there is a blank line, which indicates the end of the first verse and the beginning of a new stanza. Then there are five indented lines for the chorus. The first of the lines is a stanza designator, shown in curly braces as "{Chorus}." The next four lines are the four lines of the chorus, each beginning with "This is Chorus" followed by a line designation number (Ln1, Ln2, Ln3, and Ln4, respectively). In this example, the second and fourth lines are each followed by the song title, which means they will rhyme, albeit by a duplicate rhyme. The first and third lines are each followed by a random word.

Following the chorus there is a blank line, which indicates the end of the chorus and the beginning of the next stanza. The work continues with four lines of a second verse, "Verse2." Each line of the four lines begins with "This is Verse2" which is followed by a line designation number (Ln1, Ln2, Ln3, and Ln4, respectively) and a random word. In this four-line verse, the second and fourth lines rhyme, supported by the rhyming words "cue" at the end of the second line and "few" at the end of the fourth line. Notably, the rhyme pattern, ABCB, is identical for both verses.

Following the second verse there is a blank line, which indicates the end of the second verse and the beginning of a new stanza. In this case, the stanza is represented by an indented stanza designator, "<Chorus>", which here signifies that the Chorus is a repeat of {Chorus} above. The stanza designator is indented to the same level as the chorus above.

Following the chorus designator, there is a blank line, indicating the end of the stanza and the beginning of a new stanza. The work continues with three indented lines for a bridge, indented further than the indentation of the chorus. The first line is a stanza designator, "{Bridge}," followed by two lines of the bridge. Each of the two lines of the bridge begins with "This is the Bridge" and is followed by a line designation number (Ln1 and Ln2, respectively) and a rhyming word ("bat" and "cat," respectively).

The work concludes with another blank line, signifying the end of the previous stanza (the bridge), followed by another indented stanza designator, "<Chorus>," indented the same as the chorus above.

Although the depicted example has two verses, one unique chorus, and one bridge, it is understood that numerous other layouts and combinations of stanzas is possible.

FIG. 28 depicts a screen shot of a new work wizard. In particular, the Work Wizard used to generate the templated text of FIG. 27 is shown. The Work Wizard allows the author to enter a song title and select a templated layout of the work to be presented to the author. In one embodiment of the invention, as in the instant drawing, the author can select from a list of canned literary work layouts. Additionally the author can manually type into an entry box the desired New Song Format. The wizard allows the author to select from numerous stanza types and select their order. The author can choose from the following stanza codes: verse (V), chorus (C), bridge (B), prechorus (P), and post-chorus (Q). A capital letter generates a four-line stanza, while a lowercase letter generates a two-line stanza. For stanza lengths other than 2 or 4, the stanza code can be followed by a digit which states how many lines to create for the stanza, such as 3, 5, or 6. By default, the middle and last lines of each stanza will rhyme. For a couplet, both lines will rhyme. For a four-line stanza, the second and fourth lines will rhyme, giving rhyme scheme ABCB. For a six-line stanza, the rhyme scheme would be ABCDEC, with the third and sixth lines rhyming.

It is understood that the above is just one way of implementing a GUI interface for a new song wizard, and other possibilities exist. In another embodiment of the invention, a GUI supports selecting stanzas from a menu. In another embodiment of the invention, a GUI supports dragging stanzas into any desired order. The above list is not exhaustive.

FIG. 29 depicts an example of end rhyme detection and indication. In particular, the first verse of the sample literary work of FIG. 1 is depicted, both before and after automatic end rhyme detection and indication. The first box shows the verse in plain text form, without any visual indication of end rhyme. The second box shows the verse with visual indication after automatic end rhyme detection and indication has taken place. Comparing the two boxes, it is obvious that the last word of each line has been visually changed. The last word of the first line, "green", and the last word of the third line, "sweet," make an imperfect rhyme. Also, both words share identical visual indication as white text on a gray background. Also, the last word of the second line, "blue," and the last word of the fourth line, "too," also rhyme and share identical visual indication of white text on a black background. It is understood that the visual indications presented here are arbitrary. The rhyming words must have the same visual indication, but that visual indication can be of any foreground or background text color, font size, or styling. An elaborate visual identification scheme for all vowel sounds will be presented later.

As discussed earlier, the Fold mode requires Fold Patterns information to define how to fold the lines of each stanza to be folded. One possible way to define this Fold Patterns information is to detect it automatically based on visual indication of the last word of each line in the stanza. And as stated in this figure description, end rhyme detection can be used to visually indicate the last word of each line in a stanza. Therefore, end rhyme detection can be used to indirectly generate Fold Patterns information.

FIG. 30 depicts pseudocode for detecting end rhymes. To detect end rhymes, the last word of each line of the stanza is collected one at a time and then checked against the previously gathered last words for any rhyme matches. The rhyme match is based strictly on the sound of either the primary stressed vowel, if any, or the only vowel. If there are rhyme matches, the matching words are visually indicated using a predetermined visual indication scheme to be discussed later. In one embodiment of the invention, if no predetermined visual indication scheme exists for that vowel sound, and dynamic entry of a visual indication scheme is supported, the author is prompted to define one.

In one embodiment of the invention, rhyme matching is based on the sound of the primary stressed vowel. But it is understood that there are other types of rhyming that can be employed. For example, alliteration is sometimes referred to as "head rhyme." Alliteration is a rhyming scheme where the first consonant or lead vowel sound between two words is the same, such as in rock & roll, and lady & luck. There are also special cases of assonance where the first and last consonant sounds are identical but the vowel sound differs.

Examples of this would be rap & rope, and lick & lock. Such pairings can also serve as "rhymes" to satisfy matching criteria.

FIG. 31 depicts an example of internal rhyme detection and indication. In particular, the first verse of the sample literary work of FIG. 1 is depicted, both before and after automatic internal rhyme detection and indication. The first box shows the verse in plain text form, without any visual indication of internal rhyme. The second box shows the verse with visual indication after automatic internal rhyme detection and indication has taken place. Comparing the two boxes, it is obvious that the fourth and sixth words of the last line in the second box have been visually changed. The fourth word "you" and the sixth word "too," words that make a perfect rhyme, now share identical visual indication as white text on a black background.

It is understood that the visual indication presented here as white text on a black background is arbitrary. The rhyming words must have the same visual indication, but that visual indication can be of any foreground or background text color, font size, or styling. An elaborate visual identification scheme for all vowel sounds will be presented later.

It should be noted that the simple rhyme detection algorithm used for both end and internal rhyme is based simply on the stressed vowel sound which is extracted from the phonetics library. Therefore, any word that is not represented in the phonetics library cannot be found to rhyme. This means that Verse1, Ln1, Ln2, Ln3, and Ln4 can never be found to rhyme with another word because they do not exist in the phonetics library. Exploring the remaining four words in each of the four lines, it is verifiable that only "you" and "too" in the fourth line are words that actually rhyme. The detection result is as expected.

FIG. 32 depicts pseudocode for detecting internal rhymes. To detect internal rhymes, the lines to be examined are processed one line at a time. For each line, each word is collected and then the set of words is checked for any rhyme matches. In one embodiment, the rhyme match is based strictly on the sound of the primary stressed vowel, if any, or the only vowel. If there are rhyme matches, the matching words are visually indicated using a predetermined visual indication scheme to be discussed later. In one embodiment of the invention, if no predetermined visual indication scheme exists for the rhyming vowel sound, and dynamic entry of a visual indication scheme is supported, the author is prompted to define one. In another embodiment, rhyme matching is determined by means other than the sound of the primary stressed vowel, such as by alliteration or other suitable means.

FIG. 33 depicts a chart of visual rhyme indication colorization. In particular, the chart shows one embodiment of a possible predetermined visual indication scheme to be employed by the methods of detecting end and internal rhymes. Although presented in grayscale, the original chart is a colored chart. However, the chart can be adequately explained via words.

The chart consists primarily of two columns: a first "PHONETIC" column and a second "Sample_Word" column. The PHONETIC column has a row for each phonetic vowel sound in the phonetics library. In the instant case, CMUdict is used as the phonetics library and has fifteen unique vowel sounds. The CMUdict has the following vowel sounds: AA, AE, AH, AO, AW, AY, EH, ER, EY, IH, IY, OW, OY, UH, and UW. Each vowel sound in the PHONETIC column has a corresponding sample word in the Sample_Word column. Each sample word serves two purposes: (1) it demonstrates use of the vowel sound in the PHONETIC column, and (2) it describes the background color used in the visual indication of the sample word. By default, the sample word must use the vowel sound in its stressed syllable. However, this behavior can be overridden by capitalizing the syllable of the sample word which uses the vowel sound. The sample word must demonstrate use of the corresponding phonetic vowel sound. Summarizing the chart, 'AA' has sample word "olive,"'AE' has sample word "black,"'AH' has sample word "MAgenta."'AO' has sample word "orange,"'AW' has sample word "brown,"'AY' has sample word "CYan,"'EH' has sample word "red,"'ER' has sample word "purple,"'EY' has sample word "gray,"'IH' has sample word "pink,"'IY' has sample word "green,"'OW' has sample word "gold,"'OY' has sample word "turQUOISE,"'UH' has sample word "wood," and 'UW' has sample word "blue." Of note, every sample word has the background color of the same name as the sample word. The only exception is "wood," which has the color of pine wood. The sample words adequately describe the background color used for each phonetic. The text foreground color is chosen to be either black or white depending on which best complements the background color. For black, brown, red, purple, and blue, the foreground color is white. For all other colors, the foreground color is black. It is understood that the above background and foreground colors are arbitrary and that numerous other possible color combinations can be chosen. However, the above background colors were chosen strategically, to connect the vowel sound to a related color, making use of the color scheme easier for the author to use and understand.

Exploring the first few lines of the chart, the first sample word is "olive." By default, the stressed syllable should use the vowel sound. For olive, the first syllable is stressed, and the vowel sound of the first syllable is AA. Further, the visual indication of the AA phonetic is black text on an olive green background. The second sample word is "black," which uses the AE phonetic and has visual indication of white text on a black background. The third sample word is "MAgenta," which has the first syllable capitalized. Although the second syllable of "magenta" is normally stressed, the stress is overridden by the capitalization of the first syllable. The first syllable does use the vowel sound AH, and the visual indication is black text on a magenta background.

The above visual rhyme indication can be used in conjunction with the automatic end rhyme and internal rhyme detection mechanisms. For example, in FIG. 29, the sample text shows that the words "green" and "sweet" rhyme and were visually indicated with white text on a gray background. The background color gray was arbitrarily chosen to keep the image in grayscale. Using the instant chart, the colorized version would be both words indicated with a green background. Similarly, the other two words that rhyme, "blue" and "too," would be indicated with a blue background.

It is understood that the above chart is one embodiment of a scheme of visual indication to be employed by the methods of detecting end and internal rhymes. Other schemes are possible, and the presented scheme is not limiting. Also, other charts could be employed to represent other visualization schemes, such as having a visual indication scheme for use regarding alliteration. In one such embodiment, a chart has a different visual indication for each consonant sound, similar to how the instant chart shows visual indication for each vowel sound.

FIG. 34 depicts pseudocode for detecting rhythm matches between lines. To detect rhythm matches, a numeric representation of each line is created by using the stress values from the canonical forms of each word of the line, further inserting zeros to correspond to any placeholder Beats inserted by the author. Matching can then be strict or relaxed, with relaxed options for (1) considering a secondary-stress syllable as matching any stress value, and (2) ignoring any leading or trailing unstressed Beats. Possible visual indications for rhythmic matching include, but are not limited to, shading and colored borders.

FIG. 35 depicts a tabular chart of consonant families for rhyme engine use. In particular, the table shows consonants organized hierarchically for use by a rhyme engine which can generate sets of rhyming words in response to an input word. The rhyme engine uses the hierarchical relationship between consonant sounds to generate hierarchical sets of rhyming words. Two different rhyme engine methods for generating sets of rhyming words based on this chart will be presented: a tree-based method and a paths-based method.

The chart contains two top level classes: Obstruents and Sonorants. Obstruents are further categorized into the following groups: Plosives, Affricates, and Fricatives. Each of the three groups has both Voiced and Voiceless entries. The Voiced Plosives are B, D, and G. The Voiceless Plosives are P, T, and K. The Voiced Affricate is J, and the Voiceless Affricate is CH. The Voiced Fricatives are V, DH, Z, and ZH. The Voiceless Fricatives are F, TH, S, SH, and H. The Voiced Fricative DH has the consonant sound of "th" as in the word "the."

Sonorants, all of which are Voiced, are further categorized as Nasals or Approximants. The Nasals are M, N, and NG. The Approximants are further categorized as either Liquids or Glides. The Liquids are L and R. The Glides are W and Y.

Perfect rhyme occurs between two words when (1) the stressed vowel sound in both words is identical, as are any subsequent sounds, and (2) the onset of the stressed syllable in the words is different. Therefore, in perfect rhyme, the consonant sound directly after the stressed vowel is identical. When the consonant sound directly after the stressed vowel differs in an otherwise-perfect rhyme, the rhyme becomes an imperfect rhyme. The relationship between different consonant sounds and groups can be used to choose certain consonant sounds to generate imperfect rhymes.

FIG. 36 depicts a tree diagram of consonant families for rhyme engine use. In particular, the tree diagram shows the consonant families of the previous figure in graphical form and will be used for the tree-based method of generating sets of rhyming words. Nodes with solid outlines are leaves which contain actual consonants, with the consonants listed on the lower line. Nodes with dashed outlines are branches which represent some grouping of lower-level ovals.

At the top of the chart is the Consonants node, which has two branches: Obstruents and Sonorants. The Obstruents node has three branches: Plosives, Affricates, and Fricatives. Each of the three Obstruents branches has two leaves: a Voiced leaf and a Voiceless leaf. The Sonorants node has one Nasals leaf and one Approximants branch. The Approximants branch has two leaves: Liquids and Glides.

The chart can be used as the basis for a tree-based method of choosing alternate consonant sounds to appear after the primary stressed vowel sound to generate imperfect rhymes. The consonant sound after the stressed vowel in the input word is the "perfect rhyme consonant," or "PRC," and is used to generate perfect rhymes. Alternate consonants are used to generate tiered sets of imperfect rhymes.

The first tier of imperfect rhymes comes from substituting for the PRC any other consonants, if any, in the same leaf as the PRC when generating rhymes. For example, if the PRC is B, which is a Voiced Plosive, then the other Voiced Plosives, D and G, would be used to generate first tier imperfect rhymes. If the PRC is J, which is the only Voiced Affricate, there are no other first tier consonants to use and there would be no first tier imperfect rhymes. If the PRC is N, which is a Nasal, then the other Nasals, M and NG, would be used.

The second tier of imperfect rhymes comes from substituting for the PRC the consonants in any sibling nodes of the PRC node or their descendants. For example, if the PRC is B, a Voiced Plosive, then the Voiceless Plosives would be the siblings, and P, T, and K would be used. If the PRC is J, which is a Voiced Affricate, then Voiceless Affricates would be the sibling and CH would be used. If the PRC is N, then the Approximants would be the sibling and the Liquids L and R and the Glides W and Y would be used.

The third tier of imperfect rhymes comes from substituting for the PRC the consonants in any cousin nodes of the PRC or their descendants. For example, if the PRC is B, a Voiced Plosive, then the Affricates and the Fricatives would be cousins and the Affricates J and CH and the Fricatives V, DH, Z, ZH, F, TH, S, SH, and H would be used. If the PRC is J, which is a Voiced Affricate, then the Plosives and Fricatives would be cousins and the Plosives B, D, and G and the Fricatives V, DH, Z, ZH, F, TH, S, SH, H would be used. If the PRC is N, a Nasal, then all the Obstruents would be cousins and all the Plosives, Affricates, and Fricatives would be used.

The fourth tier of imperfect rhymes comes from substituting for the PRC the consonants in all the sibling nodes (and their descendants) of the PRC's grandparent node. For example, if the PRC is B, a Voiced Plosive, the PRC's grandparent node is the Obstruents, which has Sonorants as its only sibling. The descendants of the Sonorants are the Nasals, the Liquids, and the Glides, and these three leaves would be used. If the PRC is J, a Voiced Affricate, the PRC's grandparent node is the Obstruents, which has Sonorants as its only sibling. The descendants of the Sonorants are the Nasals, the Liquids, and the Glides, and these three leaves would be used. If the PRC is N, a Nasal, the PRC's grandparent node is the Consonants node, which has no siblings, so there would be no fourth tier imperfect rhymes.

The above represents the tree-based method of determining a hierarchy of imperfectly rhyming words based on the tabular chart of consonant families. The perfect rhyming words will be most pleasing to the ear. It is understood that the perfect rhymes will sound more pleasing to the ear than the first tier imperfect rhymes, the first tier imperfect rhymes more pleasing than the second tier rhymes, the second tier rhymes more pleasing than the third tier rhymes, and the third tier rhymes more pleasing than the fourth tier rhymes. The rhyme quality of each later tier is less pleasing to the ear than earlier tiers.

In summary, the consonants in the Nasals leaf will have three tiers of consonant substitution, while all other consonant leafs will have four tiers of consonant substitution. This occurs because the Nasals leaf is the only grandchild leaf of the root Consonants node. All other consonant leaves are great-grandchildren of the root Consonants node.

FIG. 37 depicts an example of rhyme engine output. In particular, output is shown from the tree-based method by which the rhyme engine can create tiered sets of imperfect rhymes. The output contains both perfect and imperfect rhymes and is therefore titled "Tiered Rhymes in Decreasing Rhyme Perfection". In the example, the input word is "bed," which ends with the Voiced Plosive D. Accordingly, a PRC of D is used to generate perfect rhymes. A sample list of perfect rhymes shown is "dead, Ed, fed, head, led, Ned, red, said, Ted, wed."

Looking to the tree-based chart in FIG. 36, the Voiced Plosive D co-resides with Voiced Plosives D and G. A sample list of Tier 1 imperfect rhymes shown is "Deb, ebb, egg, keg, leg, neg, peg, web."

Looking to the tree-based chart in FIG. 36, we see that the sibling node to the Voiced Plosives is the Voiceless Plosives, with P, T, and K. A sample list of Tier 2 imperfect rhymes is "deck, debt, get, heck, let, set, wept, wet, wreck."

Looking to the tree-based chart in FIG. 36, we see that the cousin nodes to the Voiced Plosives are the Affricates and Fricatives. A sample list of Tier 3 imperfect rhymes shown is "edge, hedge, ledge, pledge, wedge, etch, fetch, ketch, retch, stretch, wretch, dev, rev, says, Zev, deaf, death, guess, less, ref, Seth, Steph."

Looking to the tree-based chart in FIG. 36, we see that all the sibling nodes (and their descendants) of the Voiced Plosive's grandparent node include the SONORANTS, which means using all Nasals, Liquids, and Glides (M, N, NG, L, R, W, Y). A sample list of Tier 4 imperfect rhymes shown is "cell, hem, hen, men, sell, spell, stem, tell."

The above example output is limited to single-syllable words. It is understood that rhyme engine output can also involve multi-syllable words. For example, if the input word were "bedding," the PRC would still be the Voiced Plosive D and the paths followed would be the same as for the "bed" example above. However, perfect rhymes would include "heading, wedding." Tier 1 rhymes would include "ebbing, egging, kegging, legging, pegging, webbing." Tier 2 rhymes would include "decking, getting, letting, setting, wetting, wrecking." Tier 3 rhymes would include "edging, hedging, pledging, wedging, etching, fetching, retching, stretching, revving, guessing". Tier 4 rhymes would include "hemming, selling, spelling, stemming, telling."

FIG. 38 depicts a table showing consonant search paths for rhyme engine use. In particular, the table holds paths for the paths-based method by which the rhyme engine can create tiered sets of imperfect rhymes for an input word. The table consists of eight columns. The first column, labeled "Start," contains the tier number of an output set of imperfect rhymes. Each of the following seven columns is labeled with a designation of a starting consonant sound from which to begin traversing the search path listed in the respective column immediately below. In all the cells, "V" is shorthand for Voiced and "VL" is shorthand for Voiceless. Also, "same v" means the same voicing of the consonant at the top of the column, and "other v" means the opposite voicing of the consonant at the top of the column. The table contains seven unique starting points as column headers: "Plosive (V or VL)", "Affricate (V or VL)", "Fricative (V)", "Fricative (VL)", "Nasal", "Liquid", and "Glide". Any consonant used as a starting point will fall into one of the seven columns. "(V or VL)" represents that the cell can be a starting point for a consonant that is either Voiced or Voiceless. "(V)" represents that the cell can only be a starting point for a Voiced consonant. "(VL)" represents that the cell can only be a starting point for a Voiceless consonant.

The second column begins with "Plosive (V or VL)". Beneath it, the Tier 1 row contains "Plosives (same v)", the Tier 2 row contains "Plosives (other v)", the Tier 3 row contains "Affricates (same v)", the Tier 4 row contains "Affricates (other v)", the Tier 5 row contains "Fricatives (same v)", the Tier 6 row contains "Fricatives (other v)", and the Tier 7 row contains "SONORANTS".

For example, if the starting consonant is B, which is a Voiced Plosive, then Tier 1 would be the Plosives of the same voicing, or other Voiced Plosives (D and G). Tier 2 would be Plosives of the other voicing, or Voiceless Plosives (P, T, K). Tier 3 would be Affricates of the same voicing as the original consonant, which was Voiced for B, so Voiced Affricates (J). Tier 4 would be Affricates of the opposite voicing of the original, or Voiceless Affricates (CH). Tier 5 is Fricatives of the same voicing as the original Voiced B, so Voiced Fricatives (V, DH, Z, ZH). Tier 6 is Fricatives of the opposite voicing of Voiced B, so Voiceless Fricatives (F, TH, S, SH, H). Tier 7 is all SONORANTS (Nasals M, N, NG; Liquids L, R; Glides W, Y).

The third column begins with "Affricate (V or VL)". Beneath it, the Tier 1 row contains "Affricate (other v)", the Tier 2 row contains "Plosives (same v)", the Tier 3 row contains "Plosives (other v)", the Tier 4 row contains "Fricatives (same v)", the Tier 5 row contains "Fricatives (other v)", and the Tier 6 row contains "SONORANTS". There is no Tier 7 entry.

The fourth column begins with "Fricative (V)". Beneath it, the Tier 1 row contains "Fricatives (same v)", the Tier 2 row contains "Approximants", the Tier 3 row contains "Nasals", the Tier 4 row contains "Fricatives (other v)", the Tier 5 row contains "Affricates", and the Tier 6 row contains "Plosives". There is no Tier 7 entry.

The fifth column begins with "Fricative (VL)". Beneath it, the Tier 1 row contains "Fricatives (same v)", the Tier 2 row contains "Nasals", the Tier 3 row contains "Fricatives (other v)", the Tier 4 row contains "Affricates", the Tier 5 row contains "Approximants", and the Tier 6 row contains "Plosives". There is no Tier 7 entry.

The sixth column begins with "Nasal". Beneath it, the Tier 1 row contains "Nasals", the Tier 2 row contains "Liquids", the Tier 3 row contains "Glides", the Tier 4 row contains "Fricatives (V)", the Tier 5 row contains "Fricatives (VL)", the Tier 6 row contains "Affricates", and Tier 7 contains "Plosives".

The seventh column begins with "Liquid". Beneath it, the Tier 1 row contains "Liquids", the Tier 2 row contains "Nasals", the Tier 3 row contains "Glides", the Tier 4 row contains "Fricatives (V)", the Tier 5 row contains "Fricatives (VL)", the Tier 6 row contains "Affricates", and the Tier 7 row contains "Plosives".

The eighth column begins with "Glide". Beneath it, the Tier 1 row contains "Glides", the Tier 2 row contains "Liquids", the Tier 3 row contains "Nasals", the Tier 4 row contains "Fricatives", the Tier 5 row contains "Affricates", and the Tier 6 row contains "Plosives". There is no Tier 7 entry.

The above teaches the paths-based rhyme engine for creating tiered sets of imperfect rhymes for an input word. The starting column is determined by the consonant family of the PRC, which is used to generate perfect rhymes. Then each row of the PRC starting column is used to generate a subsequent tier of imperfect rhymes.

FIG. 39 depicts an example of rhyme engine output. In particular, output is shown from the search paths-based method by which the rhyme engine can create tiered sets of imperfect rhymes. The output contains both perfect and imperfect rhymes and is therefore titled "Tiered Rhymes in Decreasing Rhyme Perfection". In the example, the input word is "bed," which ends with the Voiced Plosive D. Accordingly, a PRC of D is used to generate perfect rhymes.

A sample list of perfect rhymes shown is "dead, Ed, fed, head, led, Ned, red, said, Ted, wed."

Looking to the paths-based chart in FIG. 38, the Voiced Plosive D would fall into the second column, "Plosive (V or VL)". The next row of that column shows Tier 1 as being "Plosives (same v)", which means using the other Voiced Plosives (B, G) to generate rhymes. A sample list of Tier 1 imperfect rhymes shown is "Deb, ebb, egg, keg, leg, neg, peg, web."

The next row of that column shows Tier 2 as being "Plosives (other v)", which means using Voiceless Plosives (K, P, T) to generate rhymes. A sample list of Tier 2 imperfect rhymes is "deck, debt, get, heck, let, set, wept, wet, wreck."

The next row of that column shows Tier 3 as being "Affricates (same v)", which means using Voiced Affricates (J) to generate rhymes. A sample list of Tier 3 imperfect rhymes shown is "edge, hedge, ledge, pledge, wedge."

The next row of that column shows Tier 4 as being "Affricates (other v)", which means using Voiceless Affricates (CH) to generate rhymes. A sample list of Tier 4 imperfect rhymes shown is "etch, fetch, ketch, retch, stretch, wretch."

The next row of that column shows Tier 5 as being "Fricatives (same v)", which means using Voiced Fricatives (V, DH, Z, ZH) to generate rhymes. A sample list of Tier 5 imperfect rhymes shown is "dev, rev, says, Zev."

The next row of that column shows Tier 6 as being "Fricatives (other v)", which means using Voiceless Fricatives (F, TH, S, SH, H) to generate rhymes. A sample list of Tier 6 imperfect rhymes shown is "deaf, death, guess, less, ref, Seth, Steph."

The next row of that column shows Tier 7 as being "SONORANTS", which means using all Nasals, Liquids, and Glides (M, N, NG, L, R, W, Y) to generate rhymes. A sample list of Tier 7 imperfect rhymes shown is "cell, hem, hen, men, sell, spell, stem, tell."

The above example output is limited to single-syllable words. It is understood that rhyme engine output can also involve multi-syllable words. For example, if the input word were "bedding," the PRC would still be the Voiced Plosive D and the paths followed would be the same as for the "bed" example above. However, perfect rhymes would include "heading, wedding." Tier 1 rhymes would include "ebbing, egging, kegging, legging, pegging, webbing." Tier 2 rhymes would include "decking, getting, letting, setting, wetting, wrecking." Tier 3 rhymes would include "edging, hedging, pledging, wedging". Tier 4 rhymes would include "etching, fetching, retching, stretching". Tier 5 rhymes would include "revving". Tier 6 rhymes would include "guessing". Tier 7 rhymes would include "hemming, selling, spelling, stemming, telling."

The previous example demonstrates how the paths-based method applies to dual-syllable words. In particular it demonstrates how the paths-based method applies to the first consonant sound after the stressed vowel sound in a multiple-syllable word. In fact, both the tree-based method and the paths-based method have both been applied to choose an alternate consonant to the PRC in order to generate imperfect rhymes. However, many rhyming words have syllables that come after the stressed syllable, and those syllables have vowel sounds and may also have consonant sounds. Both the tree-based and the paths-based methods may also be used to choose not only a replacement consonant for the PRC but also replacement consonants for later consonants. Any rhyming words that have any post-stressed syllable consonants replaced are imperfect rhymes. The further removed the replaced consonant is from the stressed syllable, the less noticeable the replacement, making for a more pleasing imperfect rhyme. This concept of replacing consonants in later syllables is referred to as "attenuation." The later the consonant substitution, the more attenuated the imperfection in the rhyme is from the initial stressed syllable.

As an example, consider the word "relevant." An imperfect rhyme to that word is "elephant." The PRC is the same in both words, but the leading consonant of the last unstressed syllable is different. In fact, the first two syllables are a perfect rhyme, including the first stressed syllable. In the third syllable, which is the second unstressed syllable, the V of relevant and the F of elephant are both Fricatives, which is part of the reason why the imperfect rhyme sounds so pleasing to the ear. Accordingly, the tree-based method and the paths-based method can both be used to change any post-stressed syllable consonants to generate the best sounding imperfect rhymes. It is also understood that multiple consonants can be different between two imperfectly rhyming words. The more consonants that differ between two rhyming words, the more obvious the imperfection of the rhyme. But also the further to the right that the differing consonants are from the stressed syllable, the less obvious the imperfection in the rhyme becomes. The example "relevant/elephant" is an example of an imperfect rhyme which sounds as good as a perfect rhyme, but without being as predictable or cliché. It is also an example of how an imperfect rhyme can be "attenuated," where the imperfection in the rhyme comes in a remote, unstressed syllable. In the instant rhyme pair, both words are three syllables long and begin with a primary stressed syllable. The first two syllables form a perfect rhyme. It is only the third and final syllable, which is unstressed, which differs in consonant sounds. As a result, the difference in consonant sounds, coming in the third and unstressed syllable, is attenuated. The imperfect rhyme sounds nearly perfect.

FIG. 40 depicts a screen shot of the Rhyme Wizard. In particular, it shows the full interface to the functionality of one embodiment of the Rhyme Wizard which is based on the CMUdict phonetics library and regular expressions. In that embodiment of the invention, regular expressions are used to modify the input phonetics for matching with the phonetics entries of the CMUdict, which yields sets of corresponding words as match results.

The Rhyme Wizard's GUI is divided into three main sections. At the top of the dialog box is the "Rhyme Input" section, which allows the author to define the source for which to generate rhymes. In the middle of the dialog box is the "Rhyme Selection" section, which allows the author to configure how rhymes will be generated. At the bottom of the dialog box is the "Rhyme Matches" section, which shows all the generated lists of rhymes.

The "Rhyme Input" section is for defining rhyme input and consists of three fields: the "Word/Phrase to Rhyme" field, the "Word Pronunciations" field, and the "Phonemes to Rhyme" field. The "Word/Phrase to Rhyme" field is at the top left-hand side and forms the basis of the rhyme input. Just to the right is the "Word Pronunciations" field, which shows a list of all the possible phonetic pronunciations of the word/phrase input, with the first one selected by default. The selected phonetic pronunciation is then shown in the "Phonemes to Rhyme" field and is the actual input that will be used to generate lists of rhyming words. If there are multiple entries in the "Word Pronunciations" field, the author can select one, which automatically populates the "Phonemes to Rhyme" field. Although the "Phonemes to Rhyme" field is set automatically when a recognized word is entered into the "Word/Phrase to Rhyme" field or any pronunciation is selected in the "Word Pronunciations" field, the field can also be manually edited for complete control over the input. This also allows the Rhyme Wizard to generate rhymes for words or phrases that are not in the phonetics library.

The "Rhyme Selection" section is for determining how rhymes will be generated. The section allows the author to configure the manner in which the Rhyme Wizard generates rhyming words. The section consists of the "Rhyme Engine Mode" field, the "Attenuation of Imperfection" field, the "Rhyme Perfection" field, the "Rhyme Syllables" field, and the "Matching Syllable Filter" field. The "Rhyme Engine Mode," the "Attenuation of Imperfection," and the "Rhyme Perfection" fields affect how the consonant sounds of the input phonetics are substituted when generating rhymes. The "Rhyme Syllables" field determines which subset of the syllable vowel sounds of the input phonetics must be matched when generating rhymes and which vowel sounds must be stressed. The "Matching Syllable Filter" field allows the stress of the vowel sounds created by "Rhyme Syllables" to be modified for alternative matching, and it also allows for constraining generated matches by number of syllables.

At the left of the section is the "Rhyme Engine Mode" field, which allows the author to select one of the earlier methods by which replacement consonants are chosen to create imperfect rhymes. The options are the "Tree-Based Method" and the "Paths-Based Method," both of which have been discussed earlier. Just below the "Rhyme Engine Mode" is the "Attenuation of Imperfection" field, which allows the overall operating method of the engine to be changed. By default, when consonant substitutions are made in order to check for imperfectly rhyming words, all consonants after the stressed rhyming vowel sound are substituted at the same time while checking for rhymes. The "Attenuation of Imperfection" field allows for those substitutions to take place in stages, and thus generate matching words lists with higher granularity. The field has two subfields, the "Granularity" subfield and the "Order" subfield. The "Granularity" subfield supports the "Syllables" option and the "Consonants" option. By default, consonant substitution for regular expression pattern matching takes place concurrently on all involved syllables. However, the substitution process can be staged, either one syllable at a time or one consonant at a time, according to the chosen option. Selection of either of the two options activates the "attenuated mode" of substitution, thereby yielding a larger count of smaller rhyming sets. The total number of generated rhyming words will remain the same, but the rhyming words will be organized differently for output. The "Order" subfield supports the "Reverse" option and the "Primacy/Recency" option. By default, the attenuated mode processes the involved syllables of the input phonetics in the "Reverse" order, starting with the last granular element and working towards the first involved granular element. However, selection of the "Primacy/Recency" option works similarly, except that the very last granular element is processed last, and the processing begins with the second-to-last granular element. Note that the current drawing should show "Reverse" and "Primacy/Recency" as radio buttons, with the first one selected by default.

The premise of the Attenuation of Imperfection mode is that changes of consonant or syllable coming later after the stressed vowel syllable are less unpleasant than changes coming sooner. The more "remote" or "attenuated" the change from the stressed vowel syllable, the less noticeable the change becomes. Another impact of the Attenuation of Imperfection mode is that the output rhymes are generated in an increased number of tiers, so there are more but shorter output rhymes lists. However, for a single-syllable input word to rhyme, the output will be unaffected by the state of the Attenuation of Imperfection mode, unless the "Granularity" option is set to "Consonants."

The "Rhyme Perfection" field is just to the right, and it allows the author to select whether to generate and show perfect rhymes and which levels, if any, of imperfect rhyme to generate and show. For each level of rhyme available for the selected Rhyme Engine Mode method, a checkbox is offered which, when checked, causes the relevant rhymes to be generated and shown. When "Tree-Based Method" is selected, the following five rhyme perfection options are offered: "Perfect," "Best Imperfect," "Great Imperfect," "Good Imperfect," and "Imperfect." When "Paths-Based Method" is selected, the following eight rhyme perfection options are offered: "Perfect," "Tier 1", "Tier 2," "Tier 3," "Tier 4," "Tier 5," "Tier 6," and "Tier 7," where the tiers represent the different tiers of imperfect rhyme taught in the paths-based method rhyme engine. Regardless of which engine method is used, the topmost "Perfect" option gives the best sounding rhymes, and each next option below gives imperfect rhymes of decreasing sound quality.

The "Rhyme Syllables" field selects which stressed syllable, and which, if any, following syllables, must match the "Phonemes to Rhyme" value to be considered a rhyme. The available options are "Stressed and Following," "Stressed Only," "Primary and Following," "Primary Only," and "All." Perfect rhyme exists when the stressed vowel sounds in two words are identical, as are any sounds thereafter. However, words can have multiple syllables and both primary and secondary stress. So, the "Stressed and Following" option requires the last stressed syllable, whether of primary or secondary stress, and any following vowel sounds to match. Option "Stressed Only" ignores any following sounds and only requires that the last stressed syllable vowel sound, whether of primary or secondary stress, match the last stressed syllable vowel in a potential match. Option "Primary and Following" requires that the matching process begin with the primary stressed syllable of each word and then all following syllables match, both vowel sound and stress. The "Primary Only" option requires that the primary stressed syllable vowel of each word match, ignoring any following syllables. Lastly, the "All" option requires that every syllable of the input phonemes match, regardless of which syllable is the first stressed syllable. Of the five options, "Stressed and Following" is the default, "Stressed Only" should return the most matches, and "All" is the most stringent and should return the fewest matches.

To illustrate the "Rhyme Syllables" effect, consider the word "melancholy," which has the phonetic representation "M EH1 L AH0 N K AA2 L IY0." It is a four-syllable word with the first syllable being of primary stress and the third syllable of secondary stress. By default, "Stressed" is the last stressed syllable and can be either of primary or secondary stress. So, "Stressed and Following" would require matching with the last two syllables/vowel sounds of the word, AA2 and IY0, with the AA being stressed and the IY being unstressed. Correspondingly, "Stressed Only" would require that the last stressed vowel match the AA vowel sound. But "Primary" means the one primary stressed syllable, which would be the EH1 vowel sound. So, matching "Primary and Following" would require matching the last four syllable vowels: EH1, AH0, AA2, and IY0. The "Primary Only" would require matching the EH vowel sound. And "All" would require all four syllables to match the vowel sounds and stresses: EH1, AH0, AA2, and IY0, the same as the "Primary and Following," because the word "melancholy" starts with a primary stressed syllable.

As another example, consider the word "irrelevant," which has the phonetic representation "IH2 R EH1 L AH0 V AH0 N T." It is a four-syllable word with a first syllable of secondary stress and a second syllable of primary stress. Accordingly, the "Stressed and Following" would require matching the last three syllables, EH1, AH0, and AH0. Because the last stressed syllable vowel is also the primary stressed syllable vowel, the "Primary and Following" would be the same as the "Stressed and Following" vowels. Here, the "Primary Only" would be EH1 and the "Stressed Only" would also be EH1. But the "All" would require matching all the syllable vowels, IH, EH, AH, and AH.

The "Matching Syllable Filter" field customizes the matching rhymes to generate. The "Matching Syllable Filter" field has subfields, including "Syllable Count," "Syllable Emphasis," and "Processing Filters."

The "Syllable Count" subfield allows the author to constrain the rhyming word matches by limiting the number of required syllables in each matching word. By selecting the "Exact Count" checkbox, the author can ensure that all generated rhyming words have the same number of syllables as in the "Phonemes to Rhyme" field. Alternatively, the author can select whether the syllables required to match by the "Rhyme Syllables" selection can be preceded by some number of leading syllables or followed by some number of trailing syllables or both. Additionally, the author can select a minimum number of syllables, a maximum number of syllables, or both, as requirements for generated rhyming words. By default, any "Rhyme Syllables" selection may match with words that have additional leading syllables. Also by default, the "Stressed Only" and "Primary Only" selections may match with words that have additional trailing syllables, but the "Stressed and Following," "Primary and Following," and "All" selections will not match with words with additional trailing syllables. This behavior can be overridden by the author. The author can allow any number of leading syllables, completely disallow any leading syllables, or select a numeric range of allowable leading syllables. The same options exist for selecting trailing syllables. Additionally, the author can select a numeric range of allowable syllables for matches, if desired, by setting a minimum and maximum number of syllables. The default is to not limit the number of syllables of matching rhyming words.

The "Syllable Emphasis" subfield allows for the matching stress pattern of the matching words to be modified. By default, a primary stress vowel sound will only match with another primary stress vowel sound. But that behavior can be modified by the "Relax" selection, which allows the matching of stress of a syllable to not differentiate between primary and secondary stress. Contrary to this, the "Ignore" selection causes all stress of all syllables to be ignored. This feature is useful when the author wishes to find "rhyming" words that match the ordered vowel sounds but with complete disregard to the stress of the vowels. For instance, the word "defer" has phonetic representation "D IH0 F ER1" and the word "liver" has phonetic representation "L IH1 V ER0." Normally, they are not considered rhyming words because, although the vowel sounds are the same, the first word has stress on the second syllable, and the second word has stress on the first syllable. However, with the "Ignore" selection selected, the difference in stressed syllable would be ignored and the two words would be considered as "rhyming." Accordingly, while the "Ignore" selection affects all five Rhyme Syllable selections, the "Relax" selection affects only the "Primary and Following," "Primary Only," and "All" selections, since the nature of "Stressed" in "Stressed and Following" and "Stressed Only" selections implies a relaxation of stress differentiation.

The "Processing Filters" subfield allows for some of the search criteria for matching word rhymes to be displayed and optionally edited. In one embodiment of the invention, regular expressions are used to match phonetic representations of words in a phonetics library to generate output rhymes. The "Phonemes to Rhyme" form field provides the source phonemes for which rhymes are sought and serves as a starting point, to be modified, for a regular expression ("regex") pattern to match. The Rhyme Engine Mode selection determines in how many stages the substitution of all possible consonants for the original consonants will take place. The Tree-Based Method requires up to four steps for all possible substitutions. The Paths-Based Method requires up to eight steps for all possible substitutions. The Attenuation of Imperfection Mode determines whether the selected stages of substitution will take place across all syllables or consonants of the input phonemes at once, or whether each trailing syllable or consonant of the input phonemes will be processed one at a time. The "Rhyme Syllables" selection determines which subset of the input phonemes are used as the basis of a regex pattern. That subset of phonemes dictates both the required vowel sounds and the required stress of matching vowel sounds. These requirements can be overridden by use of the "Syllable Count" and "Syllable Emphasis" subfields. Ultimately those requirements can be viewed and manually edited in the "Processing Filters" subfield.

Due to limitations in the complexity of regex matching, some regex pattern matching may be completed in two phases. Accordingly, both "Phase 1" and "Phase 2" filters are viewable and optionally editable. If the complete search can be accomplished in a single phase, the second filter will present as empty. In the current embodiment, two phases of search is required only when the author employs the functionality of setting a minimum or maximum number of syllables.

The "Rhyme Matches" section displays the matching rhymes output in a hierarchical format. For each level checkbox selected in "Rhyme Perfection," a corresponding window of generated rhymes is presented. If the Attenuation of Imperfection mode is active, the number of windows of generated rhymes is multiplied by the number of syllables or consonants to be processed individually, for each and every level of processing, as described above. Additionally, when the word to rhyme is found as a substring in one of the generated rhyming words, the word substring is capitalized, to make the author aware that the rhyme may be an identical rhyme and thus undesirable.

Walking through the instant example proves insightful. The current embodiment of the invention is based upon the CMUdict as a phonetics library and processing of the values of that library via regular expression ("regex") matching to the phonetics of an input word or phrase. The input word/phrase to rhyme is "present," which has three phonetic representations in the CMUdict, shown under Word Pronunciations. The first phonetics representation is selected, which yields the phonemes to rhyme as "P R EH1 Z AH0 N T." The Tree-Based Method of consonant substitution is selected, so the tree diagram of FIG. 35 will be employed. The Attenuation of Imperfection mode is inactive, so all syllables/consonants will be substituted simultaneously, as required. For "Rhyme Syllables," "Stressed and Following," the default, is selected. The stress pattern of the phonemes to rhyme is "10," and this appears in the Phase 1 processing filter as "[12]0", because the matching word syllables can be of either primary ("1") or secondary ("2") stress since "Stressed and Following" has been selected. If "Primary and Following" was selected, the Phase 1 processing filter would reflect "10" instead. Also by default, leading syllables are enabled in Syllable Count, so the Phase 1 filter value also begins with ".*" The Matching Syllable Filter field shows all the defaults, including allowing any number of leading syllables but not allowing any trailing syllables. Thus, the Phase 1 filter value shows in its entirety as ".*[12]0", which means matching any word that ends with a stressed syllable (of either primary or secondary stress) and an unstressed syllable. Note that this filter value refers only to syllable counts and stresses. No minimum or maximum count of total syllables is set, so the Phase 2 filter value is set to the default empty string. Note that the vowel sounds will also require matching, but those vowel sounds do not appear in this section. Rather, the vowel sounds to match appear above, in the "Phonemes to Rhyme" field of the "Rhyme Input" section.

The instant example output shows 3470 matching words in four groups. A fifth group is shown but disabled. There are five output groups in total, corresponding to the five levels of perfection in the "Rhyme Perfection" section. The first four levels are selected and the fifth level is not, so the first four output windows are populated and the fifth output window is grayed and marked as disabled, to match the selections in the "Rhyme Perfection" section. Also, "Attenuation of Imperfection" is not enabled, so the selections of Rhyme Perfection manifest in five output groups. However, because the input phonetics have two vowel sounds and therefore two syllables, activating the Syllables granularity of "Attenuation of Imperfection" would cause ten output groups to be shown rather than five. Such output would still include 3470 rhyming words, but those words would be distributed between eight active output groups rather than the four current active output groups.

Rhyme input to and output from the invention defaults as single words, but input and output phrases are supported. When an input phrase of multiple words is entered, the phonetics of each word are extracted from the phonetics library, and the combinations of all the extracted phonetics for those words are placed into the Word Pronunciations field. The top entry is selected by default, and the phonetics of that top phrase then appear in the Phonemes to Rhyme field. From there, processing occurs as usual.

Rhyme output can also be phrase-based. By default, rhyme output is based on single words, but in an alternate embodiment of the invention, the user can select phrase-based output. In this instance, in addition to single-word rhymes, rhyming phrases will be included in the output, as well, where the output phrases match the input criteria.

The instant figure shows the interface to one embodiment of the invention, an embodiment focused on preserving stressed vowel sounds and varying surrounding sounds to form perfect and imperfect rhyming matches based on assonance. In another embodiment of the invention, consonance is supported by preserving the leading consonant sound of the stressed syllable and varying the following sounds. Pararhyme, a special case of consonance, is also supported. In pararhyme, the final consonant sounds are also preserved, to support identifying special matches like rack & rock, and pal & pill, where the leading and trailing consonant sounds match identically. Employing the power of the invention, pararhymes can be determined using the last stressed syllables, which allows for words with leading unstressed syllables to be considered when selecting pararhymes. Such an example would be: began & gone & gun & lagoon. Any two of the four words make for a pleasing pararhyme. As per the concept of rhyming, introducing words with extra leading syllables makes the rhyme more interesting and less predictable.

The concept of pararhyme is quite popular in modern culture; hip-hop music, the tick-tock of a clock, people wearing flip-flops on their feet, and the social media site TikTok are some examples. Accordingly, an alternate embodiment of the invention has special support for pararhymes. The support is two-fold. The first area of support is in generating pararhymes, such as tick & tock, big & bag, began & begun. This means generating rhymes where the last stressed vowel sound differs, but all the sounds after the stressed vowel sound are identical, as are the consonant sounds just before the last stressed vowel. This yields "perfect" pararhymes. Yet imperfect pararhymes can be generated in a hierarchical fashion, similar to imperfect rhymes. For example, looking at "big" as an input, some perfect pararhymes would be: bag, beg, bog, bug, debug, et al. But employing the hierarchical substitution of consonant families yields additional good-sounding imperfect pararhymes. For example, "big" ends with a Voiced Plosive. The other Voiced Plosives are B and D. Thus the invention would also yield as "Best Imperfect" pararhymes the following: bad, babe, bade, bed, bead, bob, bod, bode, bub, boob, et al. Looking through the different outputs, two interesting pararhyme pairs come to light: big & bad, and bed & bug. These imperfect pararhyme pairs sound nearly as good as perfect pararhymes.

The second area of support for pararhymes is a special rhyming mode when the input is determined to be a pararhyme pair. Perfect rhyming is unaffected, but imperfect rhyming is affected in the special pararhyme mode. Because pararhyme pairs have a repeating pattern of consonant sounds, the invention tries to match all the syllables of the input phrase, and it supports changing consonants in a modified manner. When generating imperfect rhymes, the invention substitutes consonants from the end of the input phrase and works towards the beginning of the phrase. However, due to the inherent duplication of consonant sounds in pararhymes, the invention substitutes consonants in the two words of the pararhyme pair in parallel. For example, when generating regular imperfect rhymes for "tip top", first the last "p" would be substituted in stages, then the last "t," and then the first "p." However, in the special pararhyme mode, both p's would be substituted together, still in staged consonant substitution, in an effort to preserve the unique sound of the pararhyme as much as possible.

What is claimed is:

1. A computer-implemented method of generating a hierarchical list of sets of imperfect rhymes, wherein the computer has a processor, a memory, a user input device, and a display; and the method comprises executing on the processor the steps of:
    (a) receiving, by the computer, via the user input device, a phonetics representation to rhyme;
    (b) identifying a stressed syllable with a stressed vowel sound and a consonant sound following the stressed vowel sound in the phonetics representation;
    (c) traversing a consonant family tree to generate a staged list of consonant substitutions to substitute for the consonant sound, where the consonant family tree is a set or diagram of consonants with substitution-related relationships, the staged list is an ordered list of groups of consonants to substitute at a stage, and the traversing starts with a leaf node containing the consonant sound, any other consonant sounds in the leaf node comprise a first stage of the staged list of consonant substitutions, any consonant sounds in any sibling nodes of the leaf node or descendents thereof comprise a next stage in the staged list of consonant substitutions, any consonant sounds in any cousin nodes of the leaf node or descendents thereof comprise one or more next stages in the staged list of consonant substitutions, and any consonant sounds in any great-cousin nodes of the leaf node or descendents thereof comprise one or more next stages in the staged list of consonant substitutions;

(d) creating a staged list of modified phonetics representations from the phonetics representation via regular expressions and the staged list of consonant substitutions;

(e) generating a set of matching words for each of the modified phonetics representations by matching the each of the modified phonetics representations against entries in a phonetics library;

(f) appending the set of matching words for the each of the modified phonetics representations onto the hierarchical list of sets of imperfect rhymes; and (g) displaying, on the display, the hierarchical list of sets of imperfect rhymes.

2. The method of claim 1, wherein the consonant family tree contains all consonant sounds and has a trunk node which divides into Obstruents and Sonorants branch nodes; the Obstruents branch node further divides into Plosives, Affricates, and Fricatives branch nodes; each of the Plosives, Affricates, and Fricatives branch nodes further divides into Voiced and Voiceless leaf nodes; the Sonorants branch node further divides into a Nasals leaf node and an Approximants branch node; and the Appoximants branch node further divides into Liquids and Glides leaf nodes.

3. The method of claim 1, wherein the phonetics representation is generated by:
 (a) receiving, via the user input device, an input word or phrase to rhyme;
 (b) displaying, on the display, a set of phonetics representations for the input word or phrase; and
 (c) selecting, via the user input device, the phonetics representation from the set of phonetics representations.

4. The method of claim 1, wherein one or more of all consonant sounds after the stressed vowel are substituted at the same time or in the same place, and each of the one or more of all consonant sounds has a corresponding staged list of consonant substitutions.

5. The method of claim 1, wherein each of the consonant sounds after the stressed vowel is substituted sequentially with each group of consonants in the staged list for the each of the consonant sounds, starting with the last consonant sound and individually substituting each next left consonant until finishing with the consonant sound following the stressed vowel.

6. The method of claim 1, wherein all consonant sounds after the stressed vowel are substituted sequentially by syllable, starting with the consonant sounds in the last syllable and substituting the consonants in each next left syllable until finishing with the consonants in the stressed syllable.

7. The method of claim 1, wherein each of the consonant sounds after the stressed vowel is substituted sequentially with each group of consonants in the staged list for the each of the consonant sounds, starting with the consonant sound following the stressed vowel and individually substituting each next right consonant until finishing with the last consonant sound.

8. The method of claim 1, wherein all consonant sounds after the stressed vowel are substituted sequentially by syllable, starting with the consonant sounds in the stressed syllable and substituting the consonants in each next right syllable until finishing with the consonants in the last syllable.

9. A non-transitory computer-readable medium storing instructions that, when executed by a processor, cause a computer to generate a hierarchical list of sets of imperfect rhymes, wherein the computer has the processor, a memory, a user input device, and a display; and the method comprises executing on the processor the steps of:
 (a) receiving, by the computer, via the user input device, a phonetics representation to rhyme;
 (b) identifying a stressed syllable with a stressed vowel sound and a consonant sound following the stressed vowel sound in the phonetics representation;
 (c) traversing a consonant family tree to generate a staged list of consonant substitutions to substitute for the consonant sound, where the consonant family tree is a set or diagram of consonants with substitution-related relationships, the staged list is a list of groups of consonants to substitute at a stage, and the traversing of the consonant family tree starts with a leaf node containing the consonant sound, any other consonant sounds in the leaf node comprise a first stage of the staged list of consonant substitutions, any consonant sounds in any sibling nodes of the leaf node or descendents thereof comprise a next stage in the staged list of consonant substitutions, any consonant sounds in any cousin nodes of the leaf node or descendents thereof comprise one or more next stages in the staged list of consonant substitutions, and any consonant sounds in any great-cousin nodes of the leaf node or descendents thereof comprise one or more next stages in the staged list of consonant substitutions;
 (d) creating a staged list of modified phonetics representations from the phonetics representation via regular expressions and the staged list of consonant substitutions;
 (e) generating a set of matching words for each of the modified phonetics representations by matching the each of the modified phonetics representations against entries in a phonetics library;
 (f) appending the set of matching words for the each of the modified phonetics representations onto the hierarchical list of sets of imperfect rhymes; and
 (g) displaying, on the display, the hierarchical list of sets of imperfect rhymes.

10. The non-transitory computer-readable medium of claim 9, wherein the consonant family tree contains all consonant sounds and has a trunk node which divides into Obstruents and Sonorants branch nodes; the Obstruents branch node further divides into Plosives, Affricates, and Fricatives branch nodes; each of the Plosives, Affricates, and Fricatives branch nodes further divides into Voiced and Voiceless leaf nodes; the Sonorants branch node further divides into a Nasals leaf node and an Approximants branch node; and the Appoximants branch node further divides into Liquids and Glides leaf nodes.

* * * * *